United States Patent
Ung et al.

(10) Patent No.: US 7,894,797 B2
(45) Date of Patent: Feb. 22, 2011

(54) WIRELESS CHAT AUTOMATIC STATUS SIGNALING

(75) Inventors: Dara Ung, Odenton, MD (US); Mark Titus, Arnold, MD (US); Johanna Wilson, Annapolis, MD (US); Richard Smith, Annapolis, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

(21) Appl. No.: 12/379,448

(22) Filed: Feb. 23, 2009

(65) Prior Publication Data

US 2009/0163181 A1 Jun. 25, 2009

Related U.S. Application Data

(63) Continuation of application No. 09/814,363, filed on Mar. 23, 2001, now Pat. No. 7,522,911.

(60) Provisional application No. 60/196,104, filed on Apr. 11, 2000, provisional application No. 60/196,099, filed on Apr. 11, 2000.

(51) Int. Cl.
*H04M 1/66* (2006.01)

(52) U.S. Cl. ............... 455/412.2; 455/414.2; 455/412.1; 455/433; 455/432.3; 455/432.1; 455/415

(58) Field of Classification Search .............. 455/412, 455/414.5, 509, 422, 456.5, 466, 414.2, 412.1, 455/432.3

See application file for complete search history.

(56) References Cited

U.S. PATENT DOCUMENTS 1,103,073 A 7/1914 O'Connel (Continued)

FOREIGN PATENT DOCUMENTS

| KR | WO/2006/075856 | 7/2006 |
|---|---|---|
| WO | WO 97/41654 | 11/1997 |

OTHER PUBLICATIONS

Wollrath Java-centric distributed computing Micro, I EEE, vol. 17 Issue 3, May-Jun. 1997 pp. 44-53.

(Continued)

*Primary Examiner*—Charles N Appiah
*Assistant Examiner*—Randy Peaches
(74) *Attorney, Agent, or Firm*—William H. Bollman

(57) ABSTRACT

A technique and apparatus to provide status tracking of presence and/or location of a mobile, wireless device to a requesting entity even outside of a particular wireless system. This allows wireless service providers the ability to monitor and log changes in the status of mobile stations within and/or outside their networks. Embodiments are disclosed wherein presence and/or location information is provided to entities outside of a particular servicing wireless network using the mechanisms of call processing components of a mobile network (e.g., call setup procedures), and using standard mechanisms currently available to any appropriately conforming Mobile Switching Center (MSC) element. In one disclosed embodiment, a wireless chat tracking system is implemented which utilizes a change in mobile registration status to automatically notify a chat group system outside the wireless network of current status information activity regarding a relevant device, e.g., registration activity or inactivity timeout. In the wireless chat automatic status tracking system, a registration notification (REGNOT) message is either explicitly forwarded or copied to an external IP based application (e.g., to a mobile chat group system). The change in mobile registration is communicated via a suitable signaling link (e.g., SS7, TCP/IP, etc.) between a Home Location Register (HLR) and the chat group system. Therefore, instead of a conventionally closed system using SS7 messages, REGNOT messages are pushed out over TCP/IP connections to external applications (e.g., chat servers) to automatically notify the external system of the location of a particular user.

18 Claims, 17 Drawing Sheets

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll et al. |
| 5,014,206 A | 5/1991 | Scribner et al. |
| 5,043,736 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,119,104 A | 6/1992 | Heller |
| 5,144,283 A | 9/1992 | Arens et al. |
| 5,150,113 A | 9/1992 | Bluthgen |
| 5,161,180 A | 11/1992 | Chavous |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer et al. |
| 5,223,844 A | 6/1993 | Mansell et al. |
| 5,235,630 A | 8/1993 | Moody et al. |
| 5,239,570 A | 8/1993 | Koster |
| 5,243,645 A | 9/1993 | Bissell et al. |
| 5,266,944 A | 11/1993 | Carrol et al. |
| 5,289,527 A | 2/1994 | Tiedemann, Jr. |
| 5,293,642 A | 3/1994 | Lo |
| 5,299,132 A | 3/1994 | Wortham |
| 5,325,302 A | 6/1994 | Izidon et al. |
| 5,334,974 A | 8/1994 | Simms et al. |
| 5,343,493 A | 8/1994 | Karimullah |
| 5,347,568 A | 9/1994 | Moody et al. |
| 5,351,235 A | 9/1994 | Lahtinen |
| 5,361,212 A | 11/1994 | Class et al. |
| 5,363,425 A | 11/1994 | Mufti et al. |
| 5,374,936 A | 12/1994 | Feng |
| 5,379,451 A | 1/1995 | Nakagoshi et al. |
| 5,381,338 A | 1/1995 | Wysocki et al. |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,398,190 A | 3/1995 | Wortham |
| 5,406,614 A | 4/1995 | Hara |
| 5,418,537 A | 5/1995 | Bird |
| 5,423,076 A | 6/1995 | Westergreen et al. |
| 5,430,759 A | 7/1995 | Yokev |
| 5,432,841 A | 7/1995 | Rimer |
| 5,434,789 A | 7/1995 | Fraker et al. |
| 5,454,024 A | 9/1995 | Lebowitz |
| 5,461,390 A | 10/1995 | Hoshen |
| 5,470,233 A | 11/1995 | Fruchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer et al. |
| 5,488,563 A | 1/1996 | Chazelle et al. |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama et al. |
| 5,519,403 A | 5/1996 | Bickley et al. |
| 5,532,690 A | 7/1996 | Hertel |
| 5,535,434 A | 7/1996 | Siddoway et al. |
| 5,539,398 A | 7/1996 | Hall et al. |
| 5,543,776 A | 8/1996 | L'Esperance et al. |
| 5,552,772 A | 9/1996 | Janky et al. |
| 5,555,286 A | 9/1996 | Tendler |
| 5,568,119 A | 10/1996 | Schipper et al. |
| 5,574,648 A | 11/1996 | Pilley |
| 5,579,372 A | 11/1996 | Astrom |
| 5,588,009 A | 12/1996 | Will |
| 5,592,535 A | 1/1997 | Klotz |
| 5,604,486 A | 2/1997 | Lauro |
| 5,606,313 A | 2/1997 | Allen et al. |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,621,793 A | 4/1997 | Bednarek et al. |
| 5,628,051 A | 5/1997 | Salin |
| 5,633,912 A | 5/1997 | Tsoi |
| 5,673,306 A | 9/1997 | Amadon et al. |
| 5,682,600 A | 10/1997 | Salin |
| 5,692,037 A | 11/1997 | Friend |
| 5,694,546 A | 12/1997 | Reisman |
| 5,719,918 A | 2/1998 | Serbetciouglu |
| 5,740,534 A | 4/1998 | Ayerst et al. |
| 5,758,088 A | 5/1998 | Bezaire et al. |
| 5,761,618 A | 6/1998 | Lynch et al. |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,793,859 A | 8/1998 | Mathews |
| 5,794,142 A | 8/1998 | Vantilla et al. |
| 5,797,091 A | 8/1998 | Clise et al. |
| 5,797,094 A | 8/1998 | Houde et al. |
| 5,797,096 A | 8/1998 | Lupien et al. |
| 5,802,492 A | 9/1998 | DeLorme et al. |
| 5,806,000 A | 9/1998 | Vo et al. |
| 5,822,700 A | 10/1998 | Hult et al. |
| 5,825,283 A | 10/1998 | Camhi |
| 5,828,740 A | 10/1998 | Khuc et al. |
| 5,889,473 A | 3/1999 | Wicks |
| 5,903,726 A | 5/1999 | Donovan |
| 5,905,736 A | 5/1999 | Ronen et al. |
| 5,920,820 A | 7/1999 | Qureshi |
| 5,920,821 A | 7/1999 | Seaholtz et al. |
| 5,930,701 A | 7/1999 | Skog |
| 5,940,756 A | 8/1999 | Sibecas |
| 5,941,945 A | 8/1999 | Aditham |
| 5,943,399 A | 8/1999 | Bannister et al. |
| 5,946,629 A | 8/1999 | Sawyer et al. |
| 5,946,630 A | 8/1999 | Willars et al. |
| 5,949,326 A | 9/1999 | Wicks et al. |
| 5,950,130 A | 9/1999 | Coursey |
| 5,953,398 A | 9/1999 | Hill |
| 5,959,543 A | 9/1999 | LaPorta |
| 5,960,074 A | 9/1999 | Clark |
| 5,963,864 A | 10/1999 | O'Neil |
| 5,966,663 A | 10/1999 | Gleason |
| 5,974,054 A | 10/1999 | Couts et al. |
| 5,974,133 A | 10/1999 | Fleischer |
| 5,978,685 A | 11/1999 | Laiho |
| 5,987,323 A | 11/1999 | Huotari |
| 5,999,811 A | 12/1999 | Molne |
| 6,021,333 A | 2/2000 | Anderson |
| 6,035,025 A | 3/2000 | Hanson |
| 6,038,444 A | 3/2000 | Schipper |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen et al. |
| 6,073,004 A | 6/2000 | Balachandran |
| 6,073,015 A | 6/2000 | Berggren et al. |
| 6,075,982 A | 6/2000 | Donovan et al. |
| 6,078,583 A | 6/2000 | Takahara |
| 6,081,508 A | 6/2000 | West et al. |
| 6,094,574 A | 7/2000 | Vance |
| 6,101,378 A | 8/2000 | Barabash et al. |

| | | |
|---|---|---|
| 6,119,014 A | 9/2000 | Alperovich et al. |
| 6,122,503 A | 9/2000 | Daly |
| 6,122,520 A | 9/2000 | Want et al. |
| 6,134,432 A | 10/2000 | Holmes |
| 6,138,158 A | 10/2000 | Boyle et al. |
| 6,144,653 A | 11/2000 | Persson |
| 6,148,197 A | 11/2000 | Bridges et al. |
| 6,148,198 A | 11/2000 | Anderson et al. |
| 6,149,353 A | 11/2000 | Nilsson |
| 6,169,891 B1 | 1/2001 | Gorham et al. |
| 6,173,181 B1 | 1/2001 | Losh |
| 6,175,922 B1 | 1/2001 | Wang |
| 6,178,331 B1 | 1/2001 | Holmes et al. |
| 6,181,935 B1 | 1/2001 | Gossman et al. |
| 6,185,602 B1 | 2/2001 | Bayrakeri |
| 6,188,752 B1 | 2/2001 | Lesley |
| 6,189,031 B1 | 2/2001 | Badger et al. |
| 6,195,543 B1 | 2/2001 | Granberg |
| 6,195,651 B1 | 2/2001 | Handel |
| 6,198,431 B1 | 3/2001 | Gibson |
| 6,199,045 B1 | 3/2001 | Giniger et al. |
| 6,205,330 B1 | 3/2001 | Winbladh |
| 6,208,854 B1 | 3/2001 | Roberts et al. |
| 6,208,870 B1 | 3/2001 | Lorello |
| 6,216,008 B1 | 4/2001 | Lee |
| 6,219,669 B1 | 4/2001 | Haff |
| 6,223,042 B1 | 4/2001 | Raffel |
| 6,223,046 B1 | 4/2001 | Hamill-Keays et al. |
| 6,226,529 B1 | 5/2001 | Bruno et al. |
| 6,244,758 B1 | 6/2001 | Solymar |
| 6,246,879 B1 | 6/2001 | Segura et al. |
| 6,249,680 B1 | 6/2001 | Wax et al. |
| 6,249,744 B1 | 6/2001 | Morita |
| 6,263,212 B1 | 7/2001 | Ross et al. |
| 6,263,372 B1 | 7/2001 | Hogan et al. |
| 6,266,614 B1 | 7/2001 | Alumbaugh |
| 6,289,373 B1 | 9/2001 | Dezonno |
| 6,301,695 B1 | 10/2001 | Burnham |
| 6,304,898 B1 | 10/2001 | Shiigi |
| 6,311,055 B1 | 10/2001 | Boltz |
| 6,314,108 B1 | 11/2001 | Ramasubramani et al. |
| 6,317,594 B1 | 11/2001 | Gossman et al. |
| 6,321,257 B1 | 11/2001 | Kotola et al. |
| 6,327,479 B1 | 12/2001 | Mikkola |
| 6,330,600 B1 | 12/2001 | Matchefts et al. |
| 6,353,614 B1 | 3/2002 | Borella et al. |
| 6,353,621 B1 | 3/2002 | Boland |
| 6,366,663 B1 | 4/2002 | Bauer et al. |
| 6,366,961 B1 | 4/2002 | Subbiah |
| 6,370,242 B1 | 4/2002 | Speers |
| 6,370,373 B1 | 4/2002 | Gerth |
| 6,373,930 B1 | 4/2002 | McConnel |
| 6,381,535 B1 | 4/2002 | Durocher |
| 6,389,421 B1 | 5/2002 | Hawkins et al. |
| 6,389,455 B1 | 5/2002 | Fuisz |
| 6,393,014 B1 | 5/2002 | Daly |
| 6,393,461 B1 | 5/2002 | Okada |
| 6,396,913 B1 | 5/2002 | Perkins, III |
| 6,397,054 B1 | 5/2002 | Hoirup |
| 6,397,064 B1 | 5/2002 | Bridges |
| 6,408,177 B1 | 6/2002 | Parikh et al. |
| 6,421,324 B1 | 7/2002 | Boyle et al. |
| 6,421,707 B1 | 7/2002 | Miller |
| 6,421,733 B1 | 7/2002 | Tso |
| 6,424,841 B1 | 7/2002 | Gustafsson |
| 6,442,589 B1 | 8/2002 | Takahashi et al. |
| 6,446,112 B1 | 9/2002 | Bunney |
| 6,456,852 B2 * | 9/2002 | Bar et al. .................. 455/456.1 |
| 6,459,892 B2 | 10/2002 | Burgan |
| 6,463,145 B1 | 10/2002 | O'Neal et al. |
| 6,470,181 B1 | 10/2002 | Maxwell |
| 6,473,622 B1 | 10/2002 | Meuronen |
| 6,480,710 B1 | 11/2002 | Laybourn |
| 6,487,180 B1 | 11/2002 | Borgstahl |
| 6,487,602 B1 | 11/2002 | Thakker |
| 6,490,450 B1 | 12/2002 | Batni et al. |
| 6,493,558 B1 | 12/2002 | Bernhart |
| 6,499,053 B1 | 12/2002 | Marquette et al. |
| 6,502,086 B2 | 12/2002 | Pratt |
| 6,505,046 B1 | 1/2003 | Baker |
| 6,507,589 B1 | 1/2003 | Ramasubramani et al. |
| 6,512,930 B2 | 1/2003 | Sandegren |
| 6,526,335 B1 | 2/2003 | Treyz |
| 6,526,351 B2 | 2/2003 | Whitham |
| 6,529,732 B1 | 3/2003 | Vainiomaki et al. |
| 6,538,561 B2 | 3/2003 | Angus |
| 6,560,456 B1 | 5/2003 | Lohita et al. |
| 6,564,261 B1 | 5/2003 | Gudjonsson et al. |
| 6,567,979 B1 | 5/2003 | deCarmo |
| 6,587,688 B1 | 7/2003 | Chambers et al. |
| 6,587,691 B1 | 7/2003 | Granstam et al. |
| 6,591,304 B1 | 7/2003 | Sitaraman et al. |
| 6,609,004 B1 | 8/2003 | Morse |
| 6,621,810 B1 | 9/2003 | Leung |
| 6,625,461 B1 | 9/2003 | Bertacchi |
| 6,654,786 B1 | 11/2003 | Fox et al. |
| 6,662,015 B2 | 12/2003 | Furlong |
| 6,667,688 B1 | 12/2003 | Menard et al. |
| 6,671,356 B2 | 12/2003 | Lewis |
| 6,674,767 B1 | 1/2004 | Kadyk |
| 6,711,411 B1 | 3/2004 | Ruffini |
| 6,718,178 B1 | 4/2004 | Sladek et al. |
| 6,725,268 B1 | 4/2004 | Jackel |
| 6,728,353 B1 | 4/2004 | Espejo et al. |
| 6,728,635 B2 | 4/2004 | Hamada |
| 6,731,943 B1 | 5/2004 | McCormick |
| 6,757,708 B1 | 6/2004 | Craig et al. |
| 6,771,971 B2 | 8/2004 | Smith |
| 6,779,022 B1 | 8/2004 | Hortsmann et al. |
| 6,785,659 B1 | 8/2004 | Landsman |
| 6,850,916 B1 | 2/2005 | Wang |
| 6,868,074 B1 | 3/2005 | Hanson |
| 6,879,835 B2 | 4/2005 | Greene |
| 6,886,017 B1 | 4/2005 | Jackson |
| 6,961,330 B1 | 11/2005 | Cattan et al. |
| 6,970,869 B1 | 11/2005 | Slaughter et al. |
| 6,985,742 B1 | 1/2006 | Giniger |
| 6,987,969 B1 | 1/2006 | Bruing |
| 6,993,325 B1 * | 1/2006 | Waesterlid ............... 455/414.1 |
| 7,020,480 B2 | 3/2006 | Coskun |
| 7,058,036 B1 | 6/2006 | Yu |
| 7,072,665 B1 | 7/2006 | Blumberg |
| 7,116,972 B1 | 10/2006 | Zhang et al. |
| 7,120,418 B2 | 10/2006 | Herajarvi |
| 7,127,264 B2 | 10/2006 | Hronek et al. |
| 7,130,383 B2 | 10/2006 | Naidoo |
| 7,145,462 B2 | 12/2006 | Dewing |
| 7,180,415 B2 | 2/2007 | Bankert |
| 7,240,108 B2 | 7/2007 | Smith |
| 7,245,216 B2 | 7/2007 | Burkley |
| 7,317,705 B2 | 1/2008 | Hanson |
| 7,386,588 B2 | 6/2008 | Mousseau |
| 7,392,038 B1 | 6/2008 | Ratschunas |
| 2001/0031641 A1 | 10/2001 | Ung |
| 2001/0032267 A1 | 10/2001 | Collison |
| 2001/0034224 A1 * | 10/2001 | McDowell et al. .......... 455/412 |
| 2001/0041579 A1 | 11/2001 | Smith et al. |
| 2002/0052968 A1 | 5/2002 | Bonefas et al. |
| 2002/0091789 A1 | 7/2002 | Katariya et al. |
| 2002/0093435 A1 | 7/2002 | Baron |
| 2002/0098851 A1 | 7/2002 | Walczak |
| 2002/0116263 A1 | 8/2002 | Gouge |
| 2002/0118800 A1 | 8/2002 | Martinez |
| 2002/0119793 A1 | 8/2002 | Hronek et al. |
| 2002/0133568 A1 | 9/2002 | Smith |
| 2002/0168986 A1 | 11/2002 | Lau et al. |

| | | |
|---|---|---|
| 2002/0181681 A1 | 12/2002 | Mani |
| 2002/0183072 A1 | 12/2002 | Steinbach |
| 2003/0008661 A1 | 1/2003 | Joyce |
| 2003/0017832 A1 | 1/2003 | Anderson |
| 2003/0022664 A1 | 1/2003 | Goldstein |
| 2003/0055912 A1 | 3/2003 | Martin et al. |
| 2003/0058096 A1 | 3/2003 | Shteyn |
| 2003/0060212 A1 | 3/2003 | Thomas |
| 2003/0086422 A1 | 5/2003 | Klinker |
| 2003/0119525 A1 | 6/2003 | Rajkotia |
| 2003/0120826 A1 | 6/2003 | Shay |
| 2003/0155413 A1 | 8/2003 | Kovesdi |
| 2003/0186709 A1 | 10/2003 | Rhodes |
| 2004/0103431 A1 | 5/2004 | Davenport et al. |
| 2004/0110524 A1 | 6/2004 | Takano et al. |
| 2004/0137921 A1 | 7/2004 | Valloppillil et al. |
| 2004/0199614 A1 | 10/2004 | Shenfield et al. |
| 2004/0203900 A1 | 10/2004 | Cedervall |
| 2004/0259531 A1 | 12/2004 | Wood et al. |
| 2005/0004968 A1 | 1/2005 | Mononen |
| 2005/0020287 A1 | 1/2005 | Pohutsky |
| 2005/0048948 A1 | 3/2005 | Holland |
| 2005/0064884 A1 | 3/2005 | Dumont |
| 2005/0132060 A1 | 6/2005 | Mo |
| 2005/0135569 A1 | 6/2005 | Dickinson |
| 2005/0141522 A1 | 6/2005 | Kadar |
| 2005/0250516 A1 | 11/2005 | Shim |
| 2005/0277432 A1 | 12/2005 | Viana |
| 2005/0282518 A1 | 12/2005 | D'Evelyn |
| 2006/0036680 A1 | 2/2006 | Shim |
| 2006/0058042 A1 | 3/2006 | Shim |
| 2006/0079249 A1 | 4/2006 | Shim |
| 2006/0109960 A1 | 5/2006 | D'Evelyn |
| 2006/0116138 A1 | 6/2006 | Simsek |
| 2006/0148415 A1 | 7/2006 | Hamalainen et al. |
| 2006/0183460 A1 | 8/2006 | Srinivasan |
| 2006/0194595 A1 | 8/2006 | Myllynen |
| 2006/0225090 A1 | 10/2006 | Shim |
| 2006/0276168 A1 | 12/2006 | Fuller |
| 2007/0037585 A1 | 2/2007 | Shim |
| 2007/0072624 A1 | 3/2007 | Niemaenmaa |
| 2007/0082681 A1 | 4/2007 | Kim |
| 2007/0082682 A1 | 4/2007 | Kim |
| 2007/0110076 A1 | 5/2007 | Brouwer |
| 2007/0117574 A1 | 5/2007 | Watanabe |
| 2007/0117577 A1 | 5/2007 | Harris |
| 2007/0149208 A1 | 6/2007 | Syrbe |
| 2007/0167177 A1 | 7/2007 | Kraufvelin |
| 2007/0182547 A1 | 8/2007 | Wachter |
| 2007/0243885 A1 | 10/2007 | Shim |
| 2008/0109650 A1 | 5/2008 | Shim |
| 2009/0221263 A1 | 9/2009 | Titus |
| 2010/0076767 A1 | 3/2010 | Vieri |

OTHER PUBLICATIONS

Appendix A, "Short Message Peer to Peer (SMPP) Interface Specification," 09588460, Jun. 6, 2000.

Java-Centric Distributed Computing by Wollrath, A et al.,; IEEE, vol. 17 Issue 3, May-Jun. 1997, pp. 44-53.

47 Code of Federal Regulations (Oct. 1, 2005 edition).

Newsletter "Sonera Bill Warning" Digital Cellular Report. Stevenage: Jun. 17, 1998. vol. 4, Iss.; p. 1.

* cited by examiner

MAST Architecture and Information Flow

| RegistrationNotification INVOKE Parameters ||
|---|---|
| Field | Value |
| Identifier | SET [NATIONAL18] |
| Length | variable octets |
| Contents ||
| ElectronicSerialNumber ||
| MobileIdentificationNumber ||
| MSCID (Serving MSC) ||
| QualificationInformationCode ||
| SystemMyTypeCode (Serving MSC or VLR) ||
| AvailabilityType ||
| BorderCellAccess ||
| ControlChannelData ||
| ExtendedMSCID (VLR) ||
| LocationAreaID ||
| PC_SSN (Serving MSC or VLR) ||
| ReceivedSignalQuality ||
| ReportType ||
| SenderIdentificationNumber ||
| SMS_ Address ||
| SMS_ MessageWaitingIndicator ||
| SystemAccessData ||
| SystemAccessType ||
| SystemCapabilities ||
| TerminalType ||
| TransactionCapability ||

RegistrationNotification INVOKE Parameters

FIG. 5B (Prior Art)

Mobile Subscriber Inactive

Shut Down
Alert

STANDARD SS7 MESSAGE
(IS-41)

FIG. 6

MSInactive

> This operation was named CSSInactive prior to this revision of the Interim Standard.

The MSInactive operation is used to indicatice that an MS is inactive. The MSInactive operation is also used by the Serving VLR to notify the HLR of the cancellation of an MS's registration. The MSInactive operation is used by the HLR to provide the MS's CallHistoryCount to the AC when the SSD is shared with the VLR, and the VLR cancels the MS's registraion.

The MSInactive operation is intitated with a TCAP INVOKE (LAST). This is carried by A TCAP QUERY WITH PERMISSION package. The Parameter Set is encoded as follows:

Table 66 MSInactive INVOKE Parameters

| MSInactive INVOKE Parameters | | | | Timer: MSIT |
|---|---|---|---|---|
| Field | Value | Type | Reference | Notes |
| Identifier | SET [NATIONAL 18] | M | 6.3.2.1 | |
| Length | variable octets | M | 6.3.2.1 | |
| Contents | | | | |
| ElectronicSerialNumber | | M | 6.5.2.63 | |
| MobileIdentificationNumber | | M | 6.5.2.81 | |
| CallHistoryCount | | O | 6.5.2.18 | a |
| DeregistrationType | | O | 6.5.2.55 | b |
| LocationAreaID | | O | 6.5.2.77 | c |
| SenderIdentificationNumber | | O | 6.5.2.116 | d |
| SMS_MessageWaitingIndicator | | O | 6.5.2.129 | e |

Notes:
a. Include if MS registration is canceled and if the SSD is shared.
b. Include from VLR to HLR and HLR to AC for MS deregistration.
c. May be included from MSC-V to VLR. Usage in the HLR is not defined.
d. Include to identify the functional entity sending this message.
e. Include to indicate that an SMS message is pending delivery.

FIG. 6B

| IP Address | Mobile ID | Presence Time/ Date | Location |
|---|---|---|---|
| | | | |

IP MESSAGE TO APPLICATION SERVER
( e.g., to Chat Server)

FIG. 7A

| IP Address | Mobile ID | Log | Presence Time/Date | Location |
|---|---|---|---|---|
| | | #1 | | |
| | | #2 | | |
| | | #3 | | |
| | | #4 | | |
| | | #5 | | |
| | | #6 | | |

IP MESSAGE TO APPLICATION SERVER

FIG. 7B

SAMPLE OF TABLE

| MSID | ACTIVE Y/N | LAST DATE/TIME | PARAMETER 1 | PARAMETER 2 | PARAMETER 3 |
|---|---|---|---|---|---|
| COMPARE FIELD | Y | N | Y | N | Y |
| SEND FIELD | Y | Y | Y | Y | Y |
| 9083067462 | Y | 120314520000 | XX | YY | ZZ |

FIG. 8

WIRELESS CHAT AUTOMATIC STATUS SIGNALING

This application is a continuation of U.S. application Ser. No. 09/814,363, entitled Wireless Chat Automatic Status Tracking to Ung et al., filed on Mar. 23, 2001 now U.S. Pat. No. 7,522,911; which claims priority from Provisional Application No. 60/196,104, entitled "Mobile Activity Status Tracker" to Wallace et al., filed on Apr. 11, 2000; from US Provisional Application No. 60/196,099, entitled "Wireless Chat Status Tracking" to Ung et al., filed on Apr. 11, 2000; and from U.S. application Ser. No. 09/576,022, entitled "Mobile Activity Status Tracker" to Wallace et al., filed on May 23, 2000, now U.S. Pat. No. 7,110,773, the entirety of all of which are expressly incorporated herein by reference.

BACKGROUND OF THE INVENTION

1. Field of the Invention

This invention relates generally to wireless carriers, Internet service providers (ISPs), information content delivery services/providers, portal sites for mobile-terminated hosting of chat groups, and/or Internet chat session hosts. More particularly, it relates to the gateway perspective of mobile device functions such as ANSI-41 automatic registration, real-time Internet message billing, real-time wireless message billing, messaging in general, wireless chat, and/or Internet chat.

2. Background of Related Art

The present invention relates to improvements to mobile wireless systems, which currently include mobility management, IS-41 mobility management, and/or registration systems, to support, e.g., Internet chat, ICQ, etc.

Up to this point, in a Wireless & Internet chat group system, a chat member must manually notify the system when he/she desires to go on-line or off-line. This invention enables a wireless carrier and/or Internet service provider to introduce a Wireless Intelligent Network (WIN) service that allows a chat room or session system to be automatically notified when the subscriber is on-line or off-line. This will allow, for example, the chat system to continually and automatically notify the subscribers of the chat group or a "buddy list" about a participant's status in a chat room/session at any time. This WIN service will be applicable to both prepaid and postpaid IS-41 networks.

Currently no system is known to provide such WIN service for wireless devices. Existing systems allow the landline internet subscriber to automatically notify the chat group when the subscriber goes on-line or off-line.

Existing technologies have not addressed the concept of automatic notification for wireless chat participants. Without this feature, members in the chat group are not aware of the member's actual status. The wireless participants have to remember to notify the chat group or buddies of his/her availability.

As is known, presence information and location information regarding a particular wireless device is recorded in a Home Location Register for the relevant wireless network.

FIG. 10 shows a conventional stand-alone Home Location Register (SHLR) architecture and message flow of a Mobile Registration Notification message (REGNOT).

In FIG. 10, a first wireless network 1060 includes a mobile switching center MSC 1010 and a stand-alone Home Location Register (SHLR) 1040. The SHLR 1040 and the MSC 1010 communicate over the cellular telephony network (and perhaps the PSTN when calls are connected to a land-line switch or calls need to be delivered via a trunk line that routes through a PSTN) via one or more switching transfer points (STPs) 1030. The protocol used for communication is IS-41 or GSM-MAP over signaling system No. 7 (SS7).

The service provider is typically given maintenance and configuration proprietary access to the database stored in the SHLR using an Operations and Maintenance Processor (OMP) and provisioning terminal console 1050, which may communicate with the SHLR using a point-to-point link, e.g., an X.25 link, an RS-232 link, or a TCP/IP link. Communications from the OMP 1050 typically relate to maintenance and configuration only, and do not relate to operational functions of the relevant wireless network.

A second wireless network 1070 servicing another wireless device 1090 includes another MSC 1020, and utilizes one or more STPs 1030 in the SS7 network.

In the given scenario, assume that the wireless device 1090 in communication with the second wireless network 1070 is serviced by the service provider of the first wireless network 1060. Thus, presence and location information regarding the second wireless device 1090 is stored and updated in the SHLR 1040 corresponding to its servicing network.

To communicate presence and location information to the 'home' register of the second wireless device 1090, a MOBILE REGISTRATION message (1.) is sent in accordance with Signaling System #7 (SS7) standards using IS-41C protocol messages through the second wireless network 1070 to the MSC 1020 of the second wireless network 1070. The 'presence' of a wireless device relates to the wireless device being powered ON and reachable in the relevant wireless network.

The MSC 1020 forwards the MOBILE REGISTRATION message (1.) upon receipt to the STP 1030 as an IS-41 REGISTRATION NOTIFICATION (REGNOT) message (2.).

The STP 1030 forwards the REGNOT message (3.) to the appropriate SHLR 1040 servicing that particular wireless device 1090.

In this way, the Home Location Register of a particular wireless device 1040 is provided with presence and location information regarding the whereabouts and registration activity of a particular subscriber (e.g., wireless device 1090).

FIG. 10 relates to a Home Location Register which is installed as a separate network element. Using a SHLR 1040 as shown in FIG. 10, the SHLR 1040 must communicate with the associated MSC 1010 using SS7 signaling through the STP 1030. Presence and location information is updated in a subscriber's Home Location Register in a similar manner when the Home Location Register is integrated onto a common platform with the MSC element. This configuration is known as an integrated Home Location Register (I-HLR).

FIG. 11 shows a conventional integrated Home Location Register (I-HLR) architecture and message flow of a Mobile Registration Notification message (REGNOT) allowing proprietary communications between elements such as the MSC and I-HLR operating on a common platform.

In particular, as shown in FIG. 11, a MOBILE REGISTRATION message (1.) is sent to the MSC 1020 providing access to the roaming wireless device 1090, and the MSC 1020 forwards the REGNOT message (2.) to the relevant STPs 1030 as shown in FIG. 10. However, instead of forwarding the REGNOT message (3.) to the SHLR 1040 as shown in FIG. 10, the REGNOT message (3.) in FIG. 11 is forwarded to the common platform including both the MSC 1110 and the I-HLR 1140. The MSC 1110 and I-HLR 1140 may communicate with one another using any desired proprietary communications protocol, without need to conform to the SS7 signaling protocol at that point. Nevertheless, the I-HLR 1140 is updated with presence and location information regarding the roaming wireless device 1090.

In the conventional scenario, presence and location information is restricted to use by the 'home' service provider of a particular wireless device. Using conventional signaling protocols, other wireless networks are not provided with presence and location information regarding wireless devices other than those which subscribe to its services. The presence and location information is conventional used only by the home service provider for routing of call information (e.g., establishing a voice connection to a mobile wireless device).

Accordingly, there is a need for providing presence and location information to entities other than just those servicing a particular wireless device, thus enabling a new host of network services and applications.

SUMMARY OF THE INVENTION

In accordance with the principles of the present invention, in a short message service center, a module for permitting automatic status tracking of a wireless chat participant by an application external to a service provider including said short message service center, a REGNOT and/or MSInactive handler comprises a registration notification and/or an MS inactivity messages receiver, and a registration/inactive message forwarder to forward a registration notification and/or MS inactivity message received by a mobile switching center over an Internet connection.

A method for automatically notifying an external chat server of a presence of a chat session participant in accordance with another aspect of the present invention comprises receiving an IS-41 conforming registration notification and MS inactive messages from one of a mobile telephony network, mobile switching center, I-HLR, and S-HLR or STP, and automatically forwarding the IS-41 conforming registration notification and MS inactive messages over an Internet connection to an external chat server.

BRIEF DESCRIPTION OF THE DRAWINGS

Features and advantages of the present invention will become apparent to those skilled in the art from the following description with reference to the drawings. Note that for simplicity of explanation, only a REGNOT message is shown in the figures. However, an MS inactivity (MSInactive) message may be conveyed in the same way as as the REGNOT message. In the drawings:

FIG. 5B is a detailed depiction of all conventional parameters of a REGNOT message.

FIG. 6 is a simplified depiction of relevant parameters of a Mobile Subscriber Inactive message in conformance with SS7 and IS-41 standards utilized for determination of inactive presence information in a MAST system, in accordance with the principles of the present invention.

FIG. 6B is a detailed description of the otherwise conventional MSInactive message parameters.

FIG. 7A is a simplified depiction of relevant parameters such as location in an exemplary Internet Protocol (IP) message sent from the MAST system to an application server (e.g., a Chat Server) via the Internet, in accordance with the principles of the present invention.

FIG. 7B is a simplified depiction of relevant parameters in another exemplary IP message such as a log of past presence and location information for a particular wireless device sent from the MAST system to an application server (e.g., a law enforcement authority) via the Internet, in accordance with the principles of the present invention.

FIG. 8 shows an exemplary Mobile Station Identity (MSID) ordered table, in accordance with the principles of the present invention.

DETAILED DESCRIPTION OF ILLUSTRATIVE EMBODIMENTS

Figure 1:
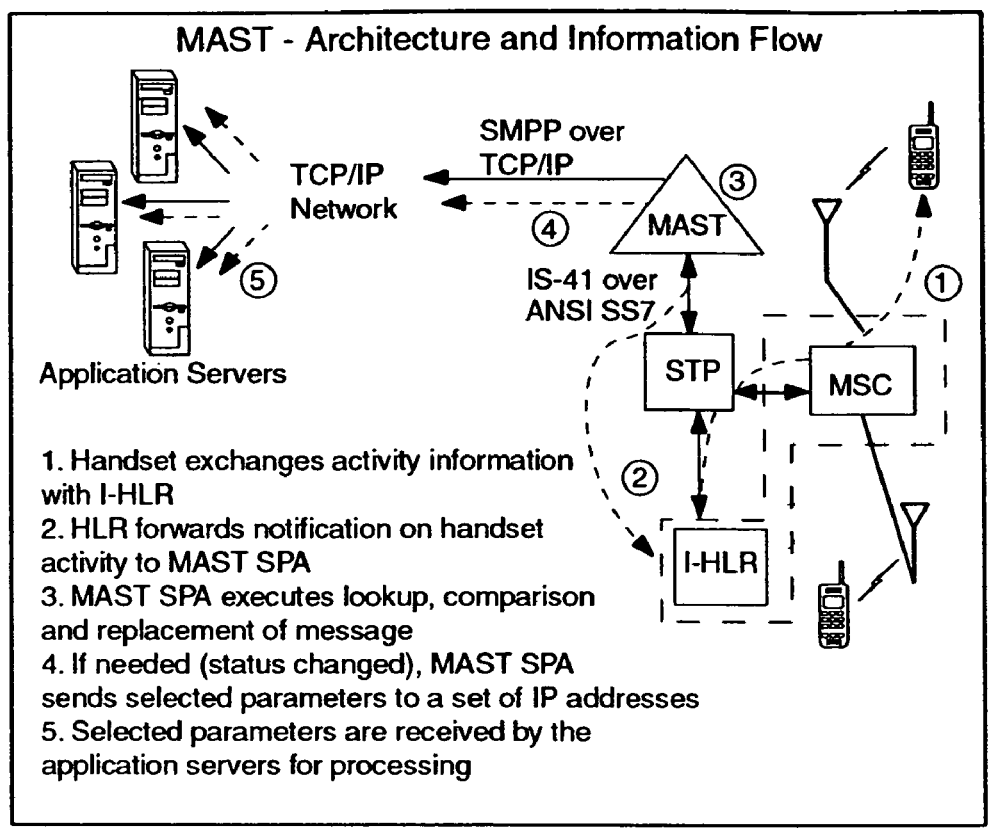
FIG. 1 shows an exemplary architecture and information flow of a mobile activity status tracker (MAST) system, in accordance with the principles of the present invention.

The present invention relates to a technique and apparatus to provide status tracking of presence and/or location of a mobile, wireless device to a requesting entity even outside of a particular wireless system. This allows wireless service providers the ability to monitor and log changes in the status of mobile stations within and/or outside their networks enabling the development of multiple applications and network services. Embodiments are disclosed wherein presence and/or location information is provided to entities outside of a particular servicing wireless network using the mechanisms of call processing components of a mobile network (e.g., call setup procedures), and using standard mechanisms currently available to any appropriately conforming Mobile Switching Center (MSC) element. An embodiment implementing a wireless chat automatic status tracking system and method is also disclosed.

Mobile presence and location are key concepts for location-based services and applications which require knowledge of mobile station/subscriber availability. Currently, conventional systems do not provide such wireless intelligent network (WIN) service for wireless devices.

It is important to note that existing systems and techniques have been conventionally located outside of a wireless network. As such, the existing systems have not been privy to, nor had the need to be privy to, triggers needed to obtain true mobile presence or location information.

Mobile Activity Status Tracker (MAST)

One series of disclosed embodiments relate to a software application package which tracks and reports status and activity of mobile wireless devices in a wireless network using mobile registration message, inactivity message forwarding, and/or mobile automatic notification of subscriber status to TCP/IP entities. This embodiment of a mobile activity status tracker is referred to herein as a Mobile Activity Status Tracker (MAST).

In accordance with the principles of the present invention, status changes that are recorded are sent via TCP/IP communications to other service provider-specific applications. The MAST system duplicates the same or similar information of a corresponding HLR, but is available as an external database entity which functions and communications are not restricted by SS7 standards.

Tracking in accordance with the principles of the present invention utilizes registration/de-registration activity of mobile stations. Utilizing status changes for a particular mobile station, key events can be noted regarding presence and/or location of the particular mobile station.

The MAST application offers entities (e.g., Internet and others) outside of a wireless infrastructure the ability to receive presence and/or location information regarding a particular mobile station to network entities outside of that which is servicing a particular wireless device. As disclosed, the MAST application has the ability to pull presence and/or location information or to push presence and/or location information to a requesting entity as desired.

Certain capabilities such as registration notification forwarding mechanisms/Registration Notification Forward Message and SMPP client which are basic to this application, are described in detail in two pending U.S. applications by the same Assignee as the present case. In particular, an exemplary SMSC is described in co-pending and co-owned U.S. application Ser. No. 09/322,929, entitled "Short Message Service Notification Between Multiple Short Message Service Centers", filed Jun. 1, 1999, by Timothy J. Lorello and Reuben D. Hart, the entirety of which is explicitly incorporated herein by reference. Moreover, an exemplary Prepaid functionality and architecture is described in co-pending and co-owned U.S. application Ser. No. 09/533,805, entitled "Prepaid Call Management In Intelligent Network", filed Mar. 23, 2000, by Elizabeth Countryman, Timothy J. Lorello, Mark Titus, and Dara Ung, the entirety of which is explicitly incorporated herein by reference.

The Mobile Activity Status Tracker (MAST) is a Service Package Application (SPA) that allows wireless service providers to monitor and log changes in the status of mobile stations within their networks. The status changes that are recorded are sent via TCP/IP to other servers for service provider-specific applications. The tracking involves the registration/de-registration activity and location of the mobile stations. The tracking need not track call-specific information, e.g., called telephone numbers or information regarding conversations sustained by the tracked wireless subscribers.

Some disclosed embodiments relate to the use of a Home Location Register (HLR) which is integrated with a Mobile Switching Center (MSC) on a common platform, referred to herein as Integrated Home Location Registers (I-HLRs) commercially available from LUCENT TECHNOLOGIES INC. in Murray Hill, N.J. Other embodiments relate to the use of a stand-alone HLR separate from the MSC platform, referred to herein as Stand alone HLR's (S-HLR). All types of HLRs are collectively referred to herein as an HLR.

The disclosed MAST SPA is implemented on an Advantage Service Control Point (SCP) Wireless Intelligent Network Platform, commercially available from LUCENT TECHNOLOGIES INC. The SCP provides the required ANSI SS7 and TCP/IP protocol support and Service Circuit Handlers (SCH) for the MAST SPA.

In accordance with the principles of the present invention, the MAST SPA receives mobile activity notifications from an HLR, and forwards selected parameters upon request or configuration to servers external to the wireless network over a TCP/IP communication link (e.g., over the Internet or over an Intranet).

FIG. 1 shows an exemplary architecture and information flow of a mobile activity status tracker (MAST) system, in accordance with the principles of the present invention.

In particular, as shown in FIG. 1, the operation of the exemplary MAST SPA includes the following exemplary steps:

(1) The handset exchanges activity information with the I-HLR, which in turn sends the Mobile Station Identity (MSID) of the mobile station and a set of relevant parameters to the MAST SPA in a registration notification forwarding mechanism message.

(2) The MAST SPA creates a temporary record for that mobile handset based on the MSID. The MAST performs a lookup in a database of existing records, using the MSID as a key. If there is no record for the MSID, then the temporary record is stored in the database. If there is a record for the same MSID, the MAST compares the temporary record with that found in the database to determine any changes in the activity status of the mobile station (or any other relevant parameters). If the activity status is the same (i.e., unchanged), the MAST overwrites the old record with the new one. On the other hand, if the activity status has changed, the activity status of the relevant mobile wireless device will be Notified or Forwarded to one or more application servers having access to the Internet using an appropriate TCP/IP interface and appropriate IP addresses (or other suitable protocol and communication path, e.g., SS7). To this end, the MAST SPA will forward a set of selected parameters (e.g., a subset of the parameters available in the temporary record) to one or more requesting or pre-configured applications servers using corresponding Internet Protocol (IP) addresses. The MAST then replaces the existing, older record with the new, updated record.

Preferably, the MAST resides on an SCP and accepts copies of IS-41 Registration Notification and MSInactive messages from the HLR(s).

Figure 2:
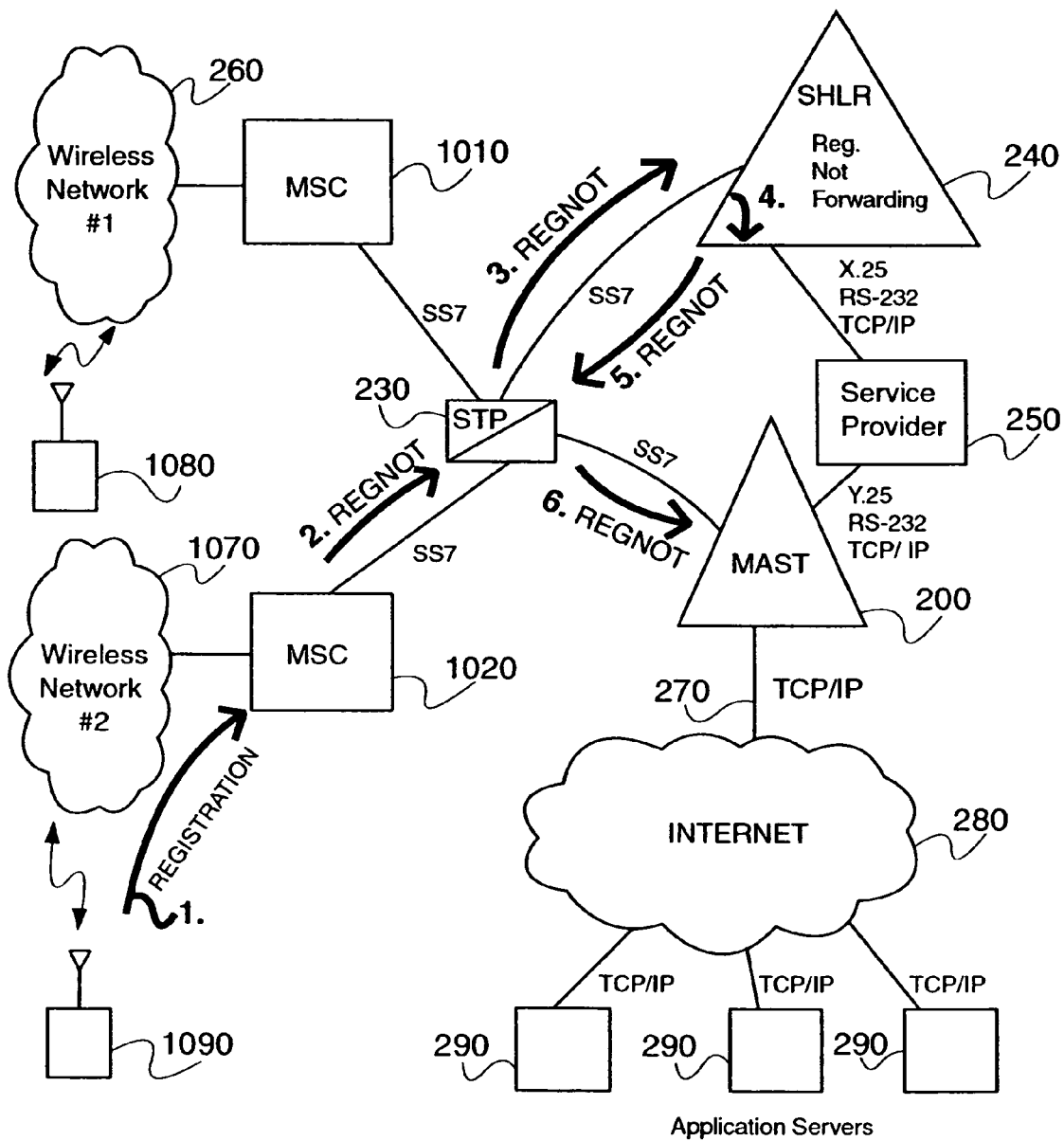
FIG. 2 is a more detailed architecture and information flow of an embodiment of a MAST system corresponding to a stand-alone Home Location Register (SHLR) including a registration notification forwarding mechanism utilizing message flows in conformance with SS7 standards and IS-41 standards, in accordance with the principles of the present invention.

FIG. 2 is a more detailed architecture and information flow of an embodiment of a MAST system 200 corresponding to a stand-alone Home Location Register (SHLR) 240 including a registration notification forwarding mechanism utilizing message flows in conformance with SS7 standards and IS-41 standards, in accordance with the principles of the present invention.

In particular, FIG. 2 shows a MAST system 200 implemented by a particular service provider corresponding to a first wireless network 260. The first wireless network 260 also includes an MSC 1010, and a SHLR 240.

A second wireless network 1070 is shown for completeness and perspective. The second wireless network 1070 includes an MSC 1020, and services a wireless device 1090.

The MAST 200 provides presence and/or location information regarding any or all subscriber's of the first wireless network to external entities, without the need to change current communication standards, e.g., utilizing otherwise conventional SS7 and IS-41 communication messages.

The MAST 200 includes information similar to that contained in the SHLR, e.g., relating to the presence and/or location of serviced wireless devices. However, in accordance with the principles of the present invention, the MAST 200 may include additional information, and/or logged information over time with respect to each individual subscriber. The MAST 200 may be implemented on a same type platform as that implementing the SHLR 240, e.g., an SCP commercially available from LUCENT TECHNOLOGIES INC.

Figure 2A:
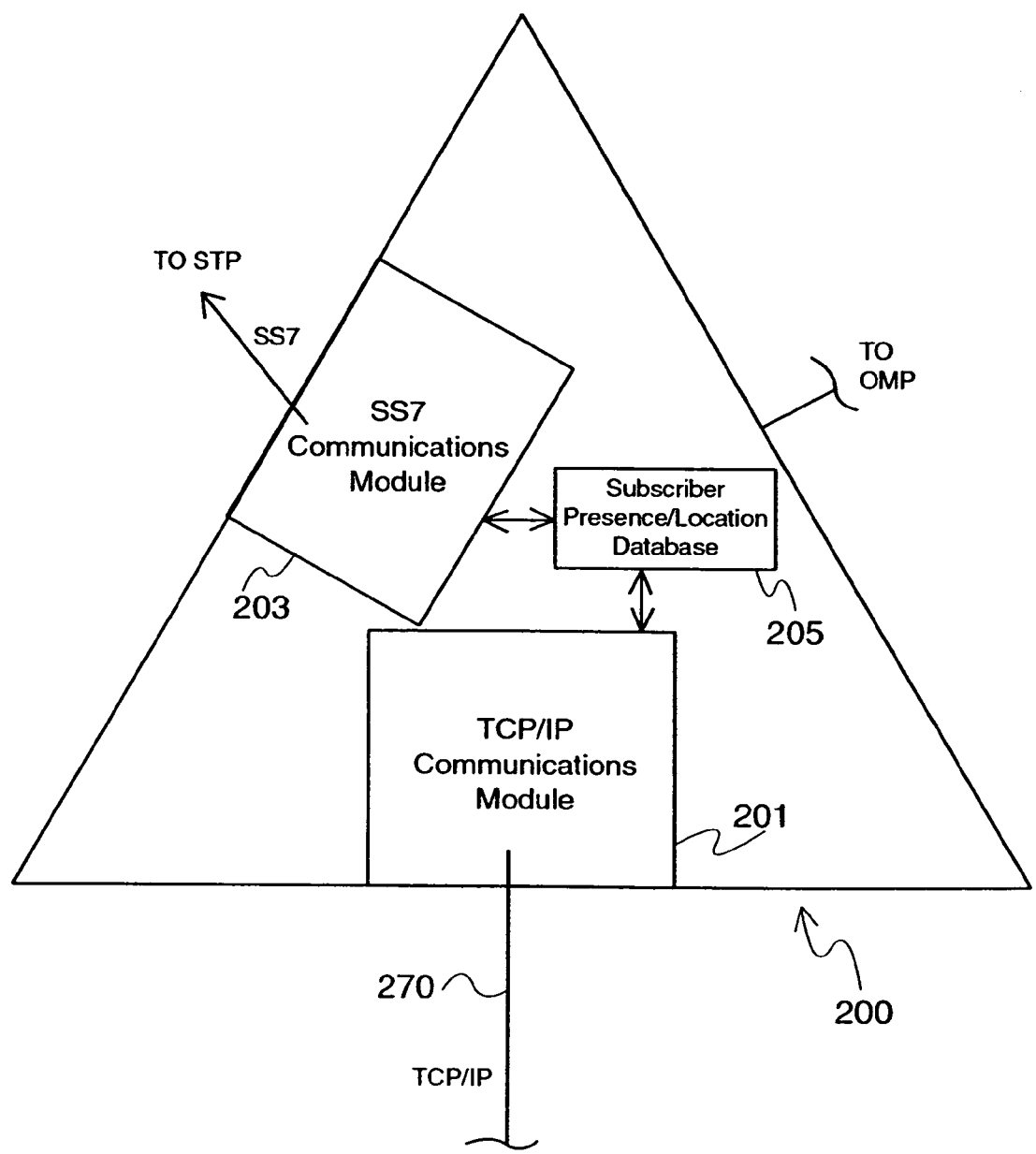
FIG. 2A shows a block diagram of the basic elements of an exemplary MAST system shown in FIG. 2.

FIG. 2A shows a block diagram of the basic elements of an exemplary MAST system 200 shown in FIG. 2.

Importantly, the MAST 200 includes a TCP/IP interface 270 and internal module 201 allowing appropriate operational access to subscriber presence and/or location information maintained therein. Thus, any or all external application servers 290 (e.g., chat servers, law enforcement servers, etc.) may access subscriber presence and or location information regarding a wireless service provider's subscribers via the Internet 280.

The subscriber's presence and/or location information maintained in a subscriber presence/location database 205 may be pre-configured for transmission to various pre-set application servers 290 via the TCP/IP (i.e., non-SS7 protocol) module 201 and associated link 270. Alternatively, presence and/or location information regarding any or all subscriber's serviced by the MAST 200 may be provided to an application server 290 upon request by the application server 290.

Referring back to FIG. 2, the particular applications which can be implemented by the various application servers 290 is virtually limitless. Any application which can make use of the presence and/or location information regarding any or all wireless subscribers (regardless of whether or not they are inside or external to a particular wireless network) may utilize the information contained in the database of the MAST 200 in accordance with the principles of the present invention.

Figure 3:
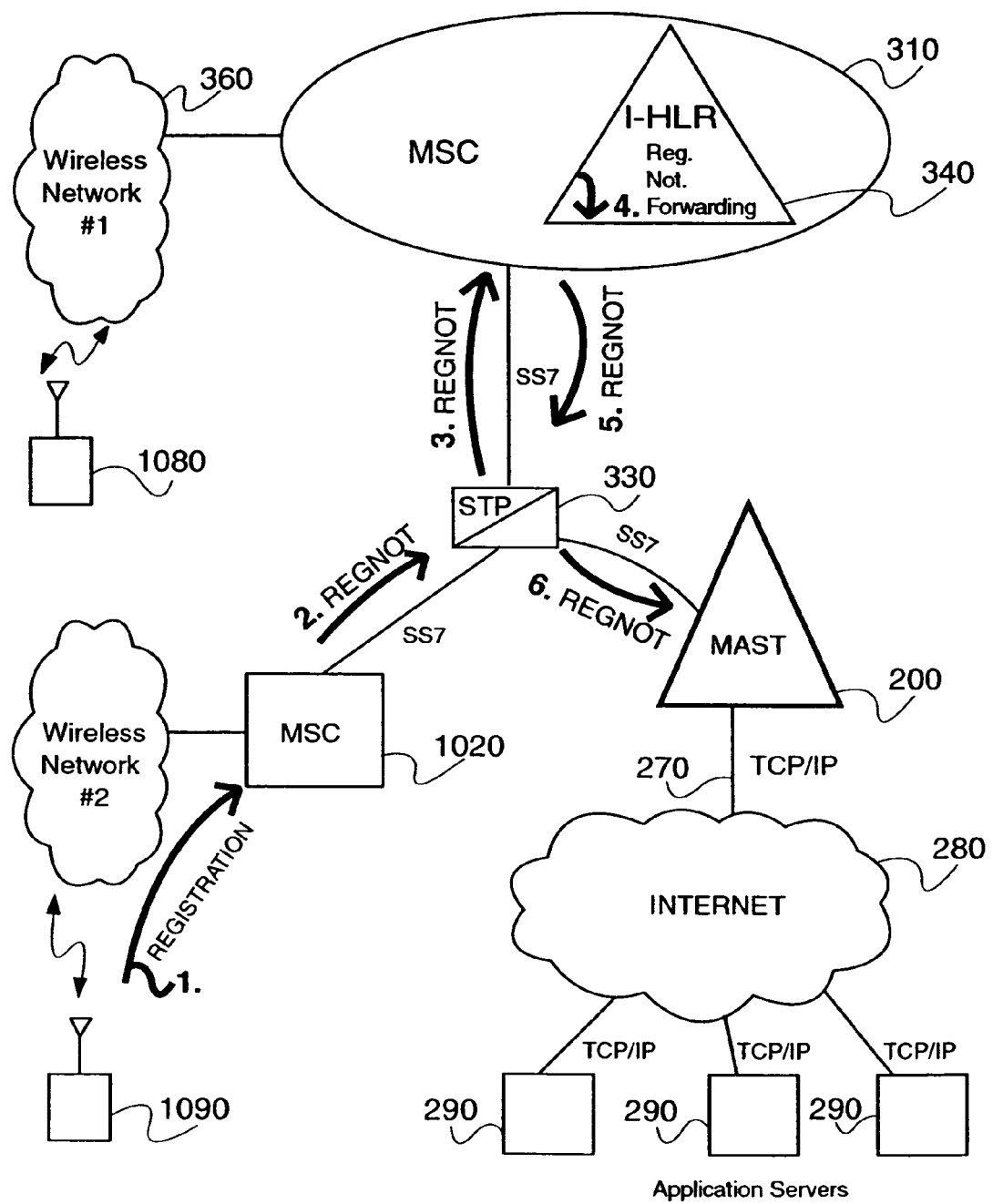
FIG. 3 is a detailed architecture and information flow of an embodiment of a MAST system corresponding to an integrated Home Location Register (I-HLR) including a registration notification forwarding mechanism integrated with a mobile switching center (MSC) on a common platform, utilizing message flows in conformance with SS7 standards and IS-41 standards, in accordance with the principles of the present invention.

The message flow shown in FIG. 2 relates to that of a stand-alone HLR 240. The message flow utilizing an integrated HLR is shown in FIG. 3. The message flow in FIG. 2 is as follows.

Figure 10:
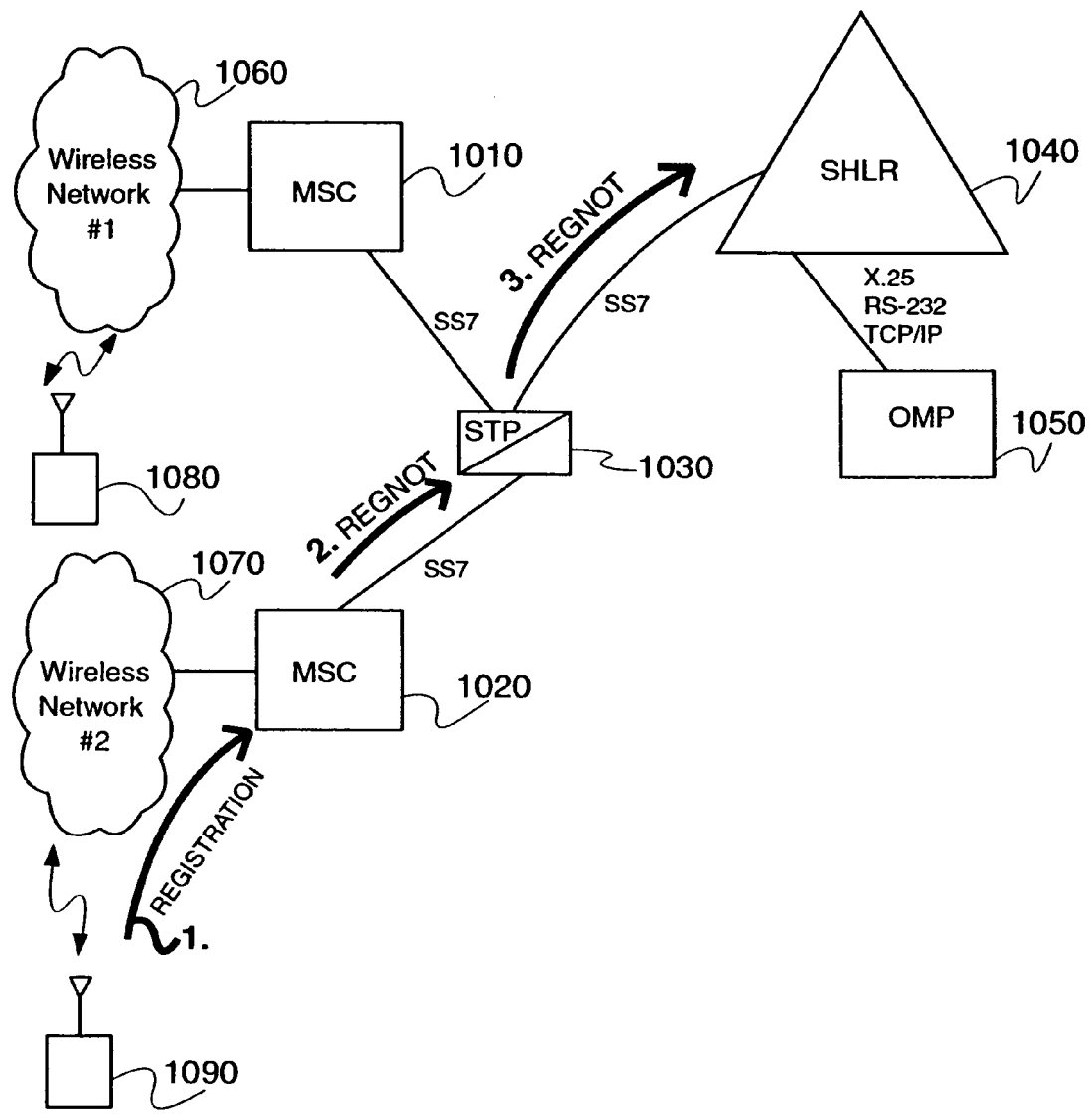
FIG. 10 shows a conventional stand-alone Home Location Register (SHLR) architecture and message flow of a Mobile Registration Notification message (REGNOT).
Figure 11:
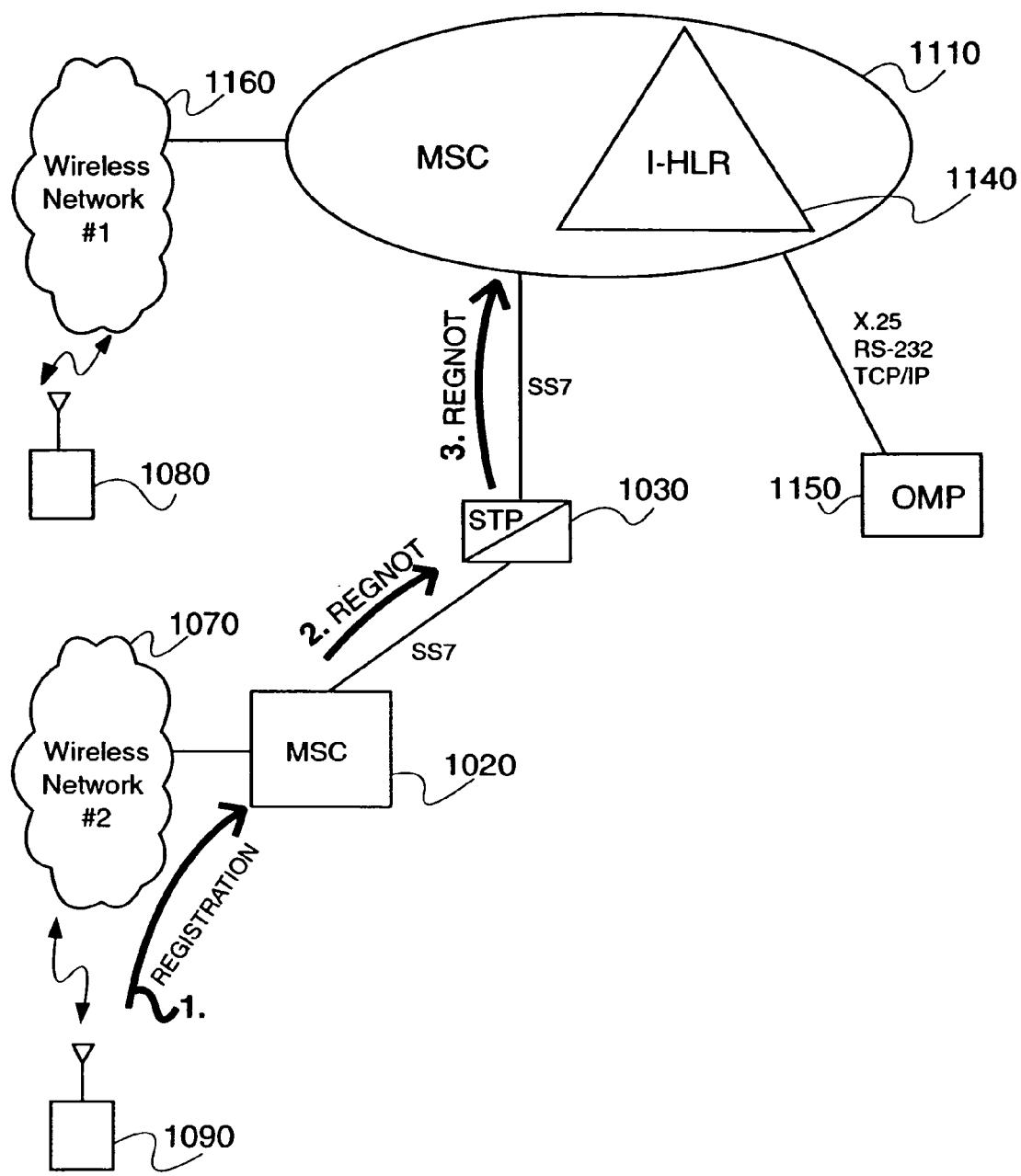
FIG. 11 shows a conventional integrated Home Location Register (I-HLR) architecture and message flow of a Mobile Registration Notification message (REGNOT) allowing proprietary communications between elements such as the MSC and I-HLR operating on a common platform.

A MOBILE REGISTRATION message (1.) is transmitted by a relevant wireless device 1090 through the host wireless network #2 1070 to its MSC 1020. That MSC 1020 sends a MOBILE REGISTRATION NOTIFICATION (REGNOT) message (2.) to an STP 1030, which forwards a REGNOT message (3.) to the SHLR 240. Up to this point the message flow is as in the conventional system shown in FIG. 10.

However, as shown in FIG. 2, the SHLR 240 implements a message referred to herein as a registration notification forwarding mechanism (4. in FIG. 2). The registration forwarding mechanism (4.) forwards a received REGNOT message (3.) back out to the STP 230 as a REGNOT message (5.), destined for the MAST 200.

The STP 230 forwards the REGNOT message (5.) from the SHLR to the MAST 200 using a REGNOT message (6.). Thus, the SHLR 240 shown in FIG. 2 is an otherwise conventional SHLR, but additionally includes the functions necessary to implement a registration notification forwarding mechanism to forward the REGNOT message (5.) to the MAST system 200 via the STP 230 using another forwarded REGNOT message (6.). With the architecture of the embodiment of FIG. 2, a service provider may need to upgrade software running on an associated SHLR 240, but need not upgrade their MSC 1010 or STP 230 from those otherwise conventionally available or already installed, providing significant cost savings and efficiency.

In response to the REGNOT message (6.) received from the STP 1030, the MAST 200 updates its database 205 appropriately. The information contained in the database 205 is then made available as appropriate over the TCP/IP link 270 to an external device, e.g., using an Intranet or the Internet 280, e.g., to all requesters, to only some requesters paying a particular fee for such a service, etc.

The service provider 250 is given operational and maintenance access to the MAST 200 similarly to conventional access given to an SHLR, e.g., using an X.25, RS-232 or TCP/IP link.

FIG. 3 is a detailed architecture and information flow of an embodiment of a MAST system 200 corresponding to an integrated Home Location Register (I-HLR) including a registration notification forwarding mechanism integrated with a mobile switching center (MSC) on a common platform, utilizing message flows in conformance with SS7 standards and IS-41 standards, in accordance with the principles of the present invention.

In particular, FIG. 3 shows that when using an I-HLR 340, the communications between the MSC/I-HLR common platform and the STP 330 are typically made over an SS7 link to the common platform, and that the elements on the common platform (e.g., the MSC 310 and the I-HLR 340) may communicate with one another in proprietary ways without the need to conform to SS7 or other external signaling requirements.

The I-HLR 340 shown in FIG. 3 is an otherwise conventional I-HLR, but additionally includes the functions necessary to implement a registration notification forwarding mechanism to forward the REGNOT message (5.) to the MAST system 200 via the STP 230 using another forwarded REGNOT message (6.). With the architecture of the embodiment of FIG. 3, a service provider may need to upgrade software running on an associated I-HLR 340, but need not upgrade their MSC 310 or STP 330 from those otherwise conventionally available or already installed.

Figure 4:
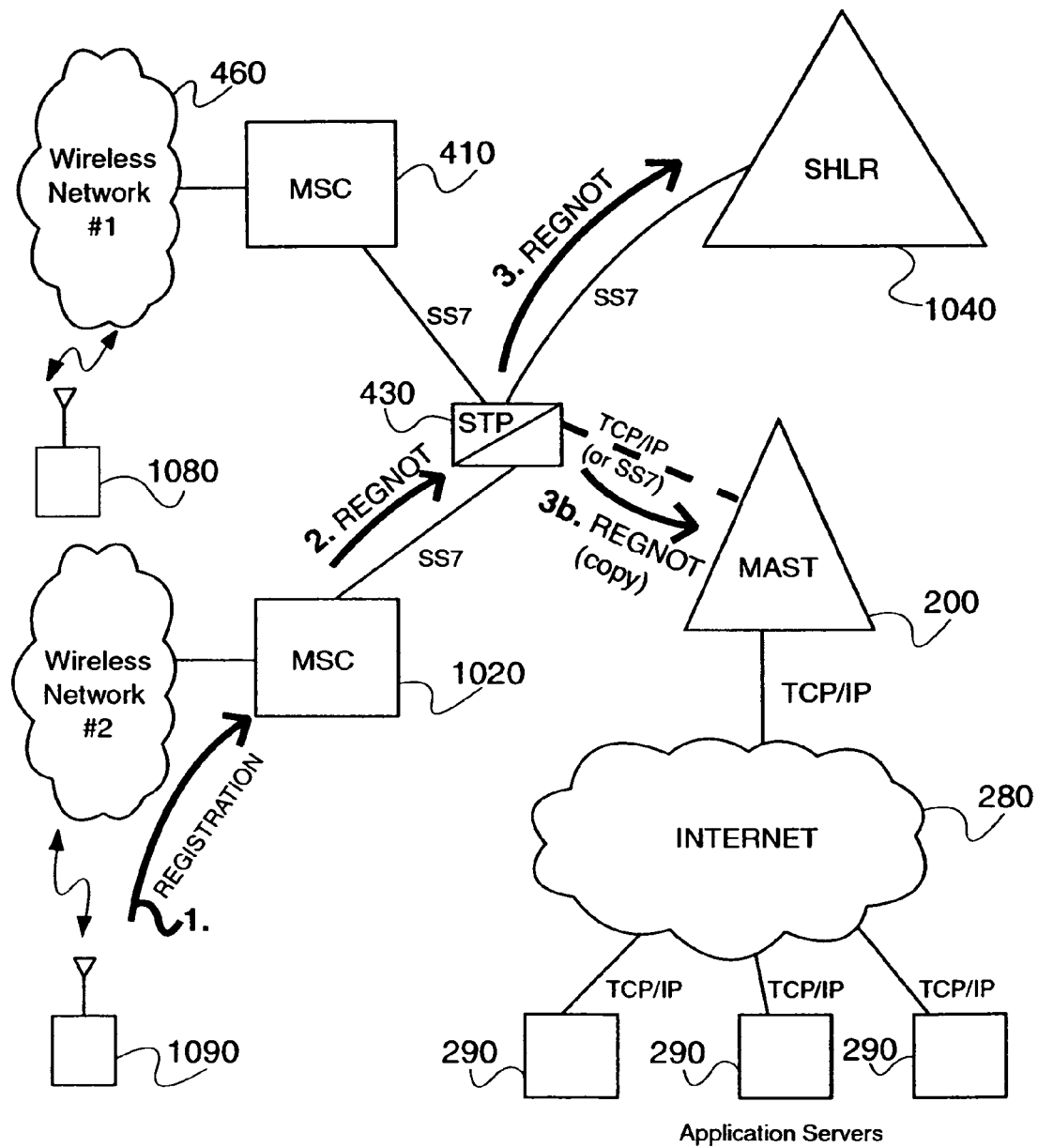
FIG. 4 is a detailed architecture and information flow of an embodiment of a MAST system corresponding to a stand-alone Home Location Register (SHLR) including a Registration Notification copy function in a signaling transfer point (STP) and a TCP/IP connection (or SS7 connection) to the MAST application, particularly useful in wireless networks having HLRs which do not include a registration notification forwarding mechanism, in accordance with the principles of the present invention.

FIG. 4 is a detailed architecture and information flow of an embodiment of a MAST system corresponding to a stand-alone Home Location Register (SHLR) including a Registration Notification copy function in a signaling transfer point (STP) and a TCP/IP connection (or SS7 connection) to the MAST application, particularly useful in wireless networks having HLRs which do not include a registration notification forwarding mechanism, in accordance with the principles of the present invention.

In particular, FIG. 4 importantly shows an STP 430 including otherwise conventional functions, but in addition includes a REGNOT copy and forward function.

The REGNOT copy and forward function in the STP 430 copies the REGNOT message (2.) received from an MSC 1020, and forwards a REGNOT copy message (3b.) to the MAST 200. The STP 430 also sends the otherwise conventional REGNOT message (3.) to the SHLR 1040.

The STP 430 shown in FIG. 4 is an otherwise conventional STP, but additionally includes the functions necessary to implement a COPY and FORWARD message to generate a copy of the REGNOT message (3.) sent to the SHLR 1040 as a copy REGNOT message (3b.) sent to the MAST 200. With the architecture of the embodiment of FIG. 4, a service provider may need to upgrade software running on an associated STP 430, but need not upgrade their MSC(s) 1010 or SHLR(s) 1040 from those otherwise conventionally available or already installed.

The MAST system architecture shown in FIG. 4 has the advantage of eliminating some communications (e.g., the registration notification forwarding mechanism trigger (4.) and the REGNOT message (5.) shown in FIG. 3), which is particularly important because the registration notification forwarding mechanism trigger (4.) is an enhanced proprietary feature (i.e., not standard) to some HLRs.

The service may be provided in a provisionless mode, and all the necessary subscriber information may reside on the HLR. Thus, there is preferably no specific subscriber provisioning necessary on the MAST SPA. Rather, the subscriber data may be maintained at the relevant HLR. The amount of memory, e.g., random access memory (RAM) and the number of SS7 links required by the SCP platform implementing the MAST SPA may be determined based on the subscriber count to be supported.

For instance, as a general guideline, consider the following example. Assuming a load of 500,000 subscribers, one (1) registration notification forwarding mechanism trigger per subscriber per hour, five (5) Mobile Inactivity Triggers (MITs) per subscriber per day, 1 KB of memory per subscriber, and an average SS7 message length of 100 octects, the number of SS7 links required in the disclosed embodiment for this configuration is approximately four (4), along with approximately 500 MB of RAM.

Use of Signaling Transfer Points (STPs) between MSCs can be implemented in multiple I-HLR environments as well.

From the perspective of a wireless service provider, MAST allows the implementation of an endless array of services and/or applications that can utilize presence and/or location information regarding a wireless device. Specific implementations of services will depend on the capabilities of the application servers that receive the information from the MAST. For instance, knowledge of registration activity in and of itself represents a huge benefit for the service provider from a marketing perspective because it can provide additional information regarding subscriber's habits, and general demographic data collection.

The MAST techniques and apparatus may also be used for law enforcement purposes. For instance, data relating to mobile station activity may be used, e.g., as evidence to build a legal case against an offender.

As another benefit, subscribers of a wireless service provider can be provided with an enhanced protection mechanism against fraud by allowing faster detection and/or tracking of delinquent mobile devices.

Depending upon particular parameters used, other services may be implemented. For instance, with knowledge of the location of a particular mobile station, a wireless service provider may implement an "Emergency Location" plan. Using such a service, mobile subscribers can have activity information (e.g., presence and/or location information, together with date and time) relating to the use of their mobile device transmitted to the MAST SPA in accordance with the principles of the present invention. The MAST SPA will log the presence and/or location information regarding relevant mobile subscribers served by the associated HRL, and pass the logged information on to any entity on the Internet or other entity or network, providing an accurate and up-to-date information source. Using the "Emergency Location" plan, the logged location information may be used by authorities to locate a person associated with that particular mobile device easier.

Figure 5A:
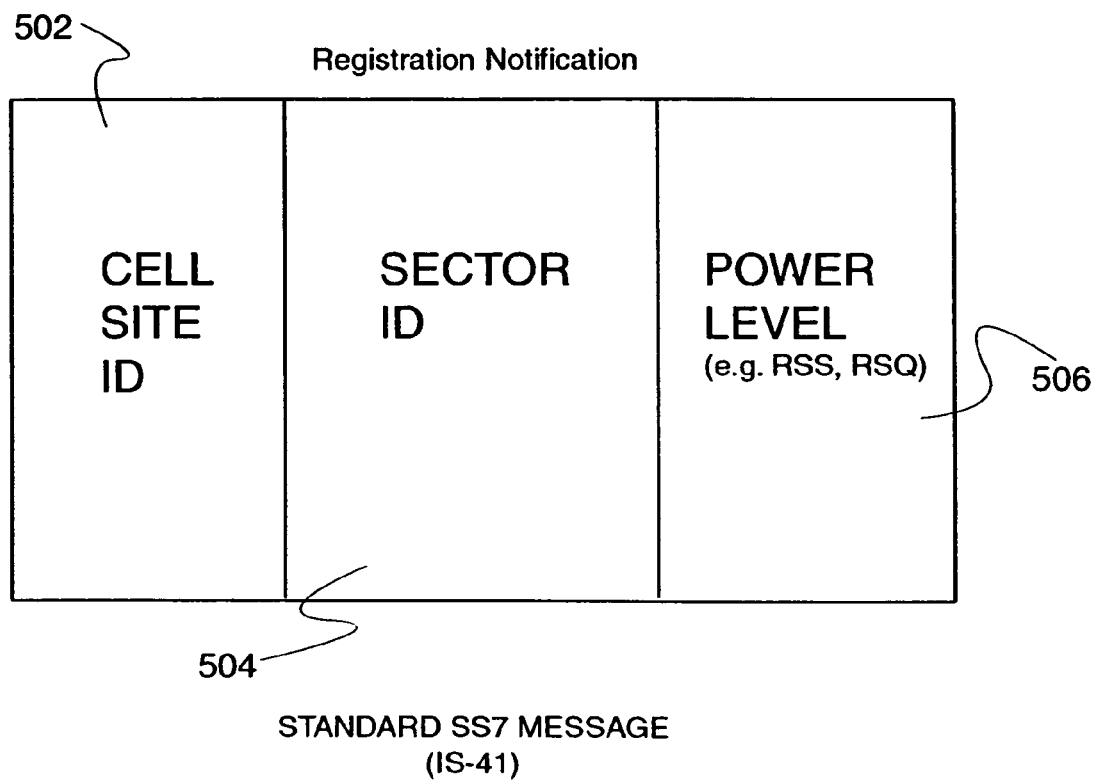
FIG. 5A is a simplified depiction of relevant parameters of a Mobile Registration Notification (REGNOT) message in conformance with SS7 and IS-41 standards utilized for determination of location information in a MAST system, in accordance with the principles of the present invention.

FIG. 5A is a simplified depiction of relevant parameters of a Mobile Registration Notification (REGNOT) message in conformance with SS7 and IS-41 standards utilized for determination of location information in a MAST system, in accordance with the principles of the present invention. FIG. 5B is a detailed depiction of all conventional parameters of a REGNOT message.

In particular, the REGNOT message parameters utilized by the MAST may be any or all parameters included or inferred from information within the standard REGNOT message shown in FIG. 5B. For instance, the cell site ID 502 and/or sector ID 504 of the cell servicing the relevant wireless device may be used to provide a location of the wireless device, and date and time of a communication may be used for presence information.

Other information such as power level 506 can be used to infer and further refine the location information. For instance, a lower power level received by the wireless device 1090 (and/or higher power output by the wireless device 1090) may be used to infer a longer distance from the relevant cell site receiving transmissions from the wireless device 1090. Conversely, a higher power level might infer that the wireless device 1090 is closer to the cell site. Thus, a sort of 'poor man's GPS' can be provided to external entities regarding the location of a subscriber's wireless device.

FIG. 6 is a simplified depiction of relevant parameters of a Mobile Subscriber Inactive message in conformance with SS7 and IS-41 standards utilized for determination of inactive presence information in a MAST system, in accordance with the principles of the present invention.

In particular, a MOBILE SUBSCRIBER INACTIVE message follows the same paths as does the REGNOT messages shown in FIGS. 2, 3 and 4. While the REGNOT message indicates an active wireless device, the receipt of a MOBILE SUBSCRIBER INACTIVE message with respect to a particular subscriber may be logged in the database 205 of the MAST 200 as presence information, i.e., that the wireless device may no longer be present.

FIG. 7A is a simplified depiction of relevant parameters such as location in an exemplary Internet Protocol (IP) message sent from the MAST system to an application server (e.g., a Chat Server) via the Internet, in accordance with the principles of the present invention.

The particular information contained either in the database 205 of the MAST and/or which is transmitted over the TCP/IP connection 270 and the Internet 280 may depend upon the particular applications operating on any of the application servers 290. Rudimentary information may include, e.g., an IP address of the application server 290, an ID of the relevant mobile wireless device, presence information such as a date and time of activity, and location information either real or inferred. Real information may include the cell site ID and/or sector ID. Inferred or extrapolated information may include, e.g., a delta distance corresponding to a power level of the wireless device's transmitter during a last contact.

FIG. 7B is a simplified depiction of relevant parameters in another exemplary IP message such as a log of past presence and location information for a particular wireless device sent from the MAST system to an application server (e.g., a law enforcement authority) via the Internet, in accordance with the principles of the present invention.

For instance, as shown in FIG. 7B, presence and/or location information may be logged into a historical file for each subscriber/wireless device. A particular mobile ID together with a series of database entries corresponding to different REGNOT commands and/or MOBILE SUBSCRIBER INACTIVE messages received by the MAST can be provided to one or more particular application servers desiring such information.

Alternatively, the presence and/or location information transmitted to a desiring application server 190 may relate to a group of subscribers having a common attribute (e.g., most active subscribers, least active subscribers, subscribers living in a particular region, etc.).

As disclosed, activity status information is tracked by the MAST as follows. Initially, the MAST receives a Mobile Registration message via a registration notification forwarding mechanism, alternatively referred to as a Registration Forward Message, from the relevant MSC/HLR (I-HLR or S-HLR), and appropriately updates the activity status in the database. Upon power down of the relevant wireless device, the MAST will receive a Mobile De-Registration message via a Mobile Inactive Trigger (MIT) from the relevant MSC/HLR, and appropriately updates the activity status in the database.

When a new message (e.g., a mobile registration message or mobile de-registration message) is received, the MAST application preferably parses the message, e.g., into up to 10 parameters, and stores the parsed message portions in an appropriate MSID ordered table.

FIG. 8 shows an exemplary Mobile Station Identity (MSID) ordered table is shown in FIG. 8.

Figure 9:
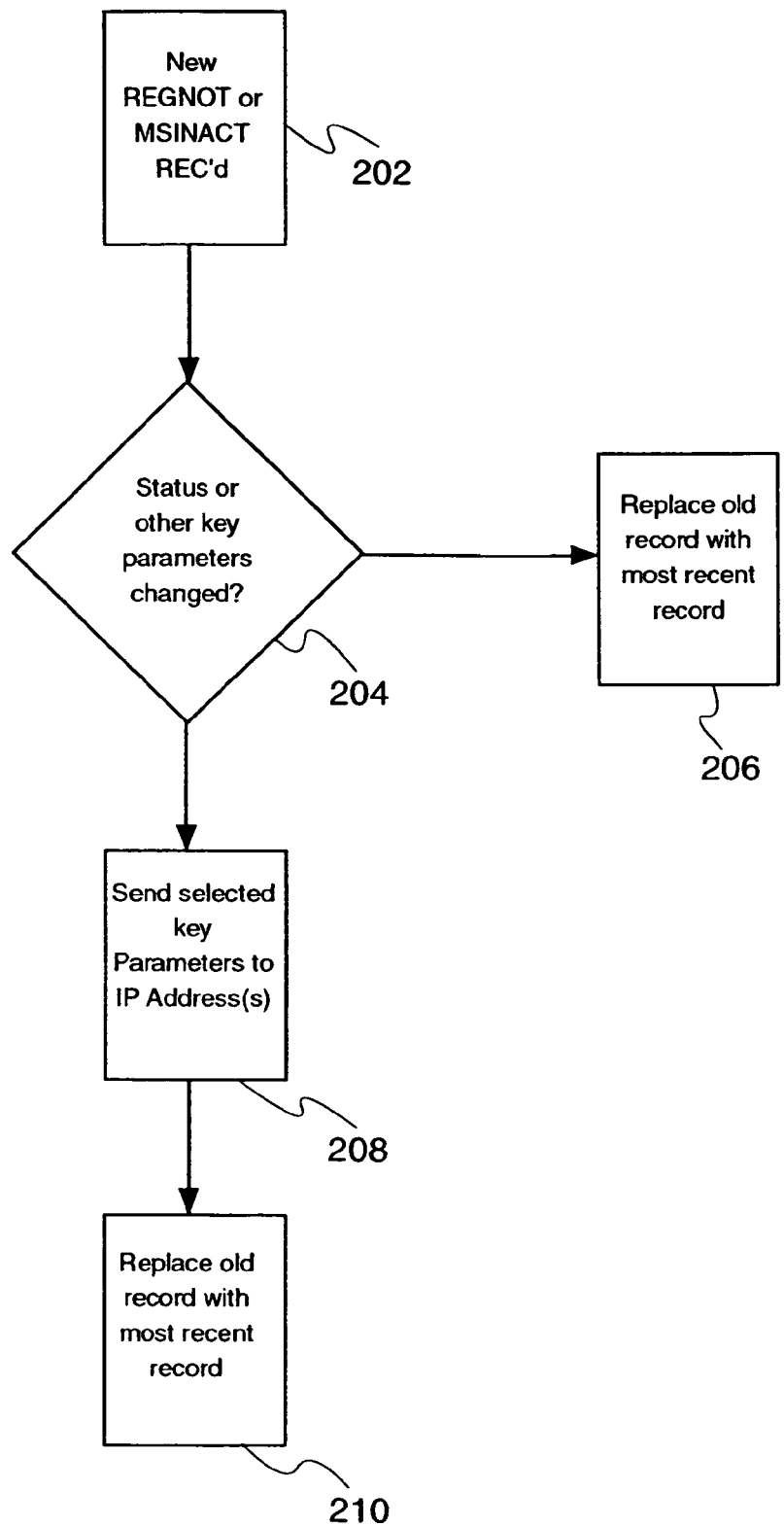
FIG. 9 shows an exemplary process by which the parsed message portions are processed.

FIG. 9 shows an exemplary process by which the parsed message portions are processed.

In particular, as shown in step 202 of FIG. 9, the process determines if a new REGNOT or MSINACT has been received.

If a record for the same MSID is found in the table of FIG. 8, in step 204 a comparison of the status and key parameters within the two records will be made.

In step 208, if the status (ACT to DEACT or DEACT TO ACT) or one of the key parameters are different from that of the previous record, a subset of key parameters up to and including all key parameters from this new record will be sent to at least one, but possibly multiple IP addresses on a network.

In steps 206 and 210, the old record is replaced in the MSID table with the new, most recent record.

The MAST receives information directly from the HLR or the STP (e.g., I-HLR or S-HLR), which has previously validated the MSID and determined the need to forward the information to the MAST.

Administration of the MAST may include, e.g., configuration and maintenance of the following:

Point-codes and Subsystem numbers of the I-HLRs that will send information to the MAST SPA.
Parameters that the I-HLR will forward to the MAST SPA in the registration notification forwarding mechanism and MIT messages.
Parameters that the MAST SPA will forward to the application servers.
Destination IP addresses and Port numbers of the application servers.
Expiration time for records that have not experienced changes over a configurable period of time.
Size of the rotating log file.

There is preferably only one record per MSID in the MAST. The relevant service provider is preferably given access to the database stored in the MAST, e.g., through the conventional operational maintenance processor (OMP).

Due to its nature, the content of this database is likely to change rapidly over time, therefore the MAST database may provide only a snapshot of the activity status of all the relevant wireless devices at any given time.

The MAST preferably keeps a temporary log of the messages sent to the application services in a rotating file. This rotating file may have a configurably fixed size, and may overwrite itself with more recent information, e.g., after a desired period of time determined by the level of message traffic. This log provides a historical representation of the activity of specific wireless devices, or groups of wireless devices.

Reports may be generated for the relevant service provider, e.g., through the OMP or via a TCP/IP connection to the Internet. Possible reports can include, e.g., various information depending upon the parameters that the relevant HLR sends to the MAST, and/or specific needs and selections made by the particular service provider.

In case the subscriber base increases, the platform can be easily scaled to increase capacity.

Being a Wireless Intelligent Network service, MAST takes advantage of the improved reliability, scalability and performance of the Advantage Platform and the flexibility of the intelligent network approach.

Additionally, MAST is an Intelligent Network application that can be executed simultaneously on a single SCP platform, such as a Short Message Service Center, Over The Air Activation, PrePaid Wireless, etc. This fact spreads the cost of the platform over several services, thus allowing the service provider to price them in a competitive way. From an operating standpoint, a single platform is easier to manage resulting in reduced maintenance costs.

Mobile Chat Location Register (MCLR)

The principles of the present invention may be used to implement a wireless chat tracking system (i.e., Mobile Chat Location Register (MCLR)) which utilizes a change in mobile registration status to automatically notify a chat group system outside the wireless network of current status information activity regarding a relevant device, e.g., registration activity or inactivity timeout.

In a disclosed embodiment, a registration notification (REGNOT) message is either explicitly forwarded or copied to an external IP based application (e.g., to a mobile chat group system). The change in mobile registration is communicated via a suitable signaling link (e.g., SS7, TCP/IP, etc.) between a Home Location Register (HLR) and the chat group system. Therefore, instead of a conventionally closed system using SS7 messages, REGNOT messages are pushed out over TCP/IP connections to external applications (e.g., chat servers) to automatically notify the external system of the location of a particular user.

In accordance with the principles of the present invention, a REGNOT message may be simply forwarded in accordance with instructions from an HLR, or all REGNOT messages received may be copied and forwarded to an external application, which then sifts through the copied and received REGNOT messages for messages of relevance to that particular external application.

Figure 12:
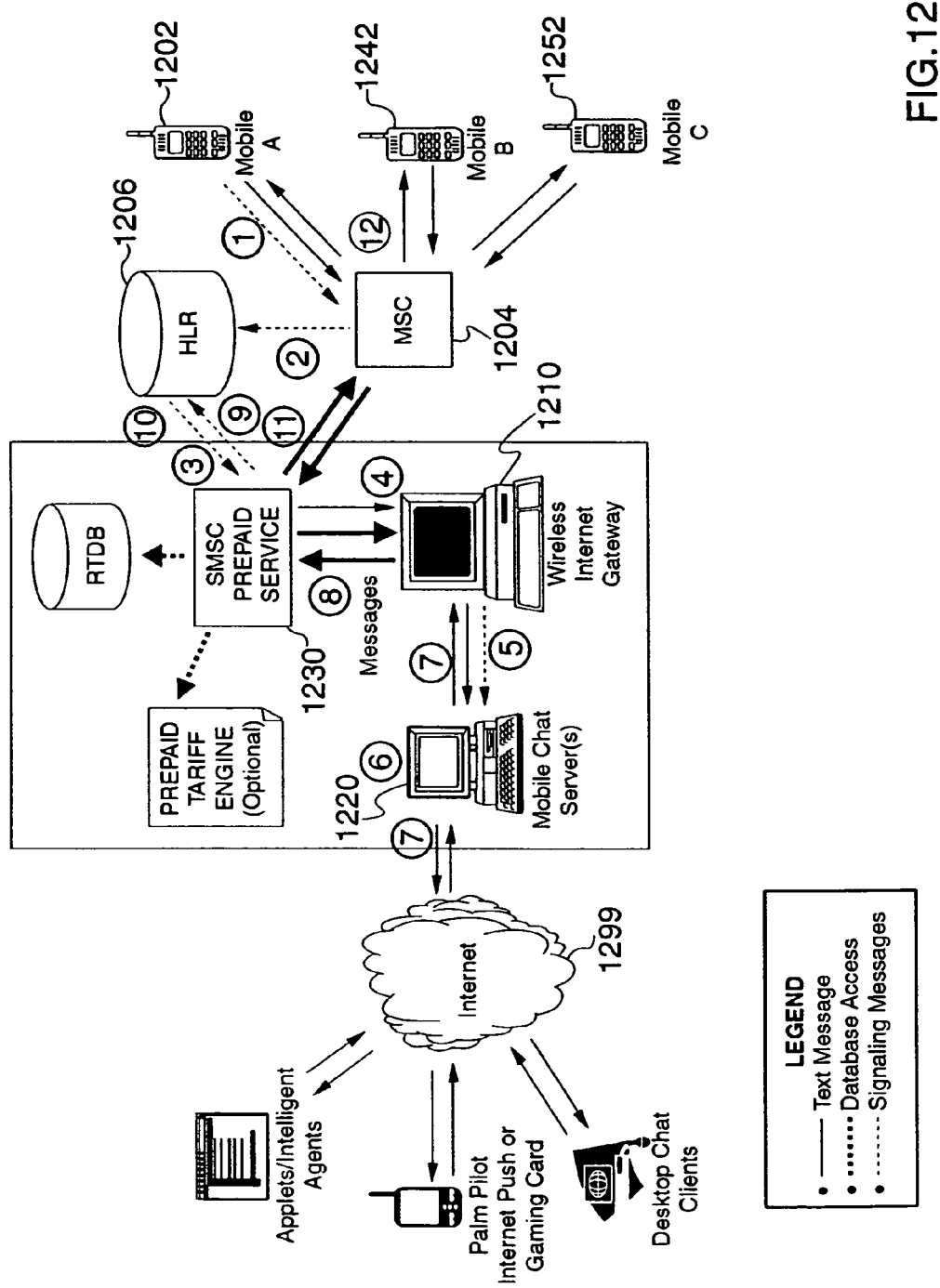
FIG. 12 shows an exemplary service implementation showing wireless chat status tracking providing an automatic on-line or off-line notification in a chat scenario using techniques and apparatus in accordance with the principles of the present invention.
Figure 13:
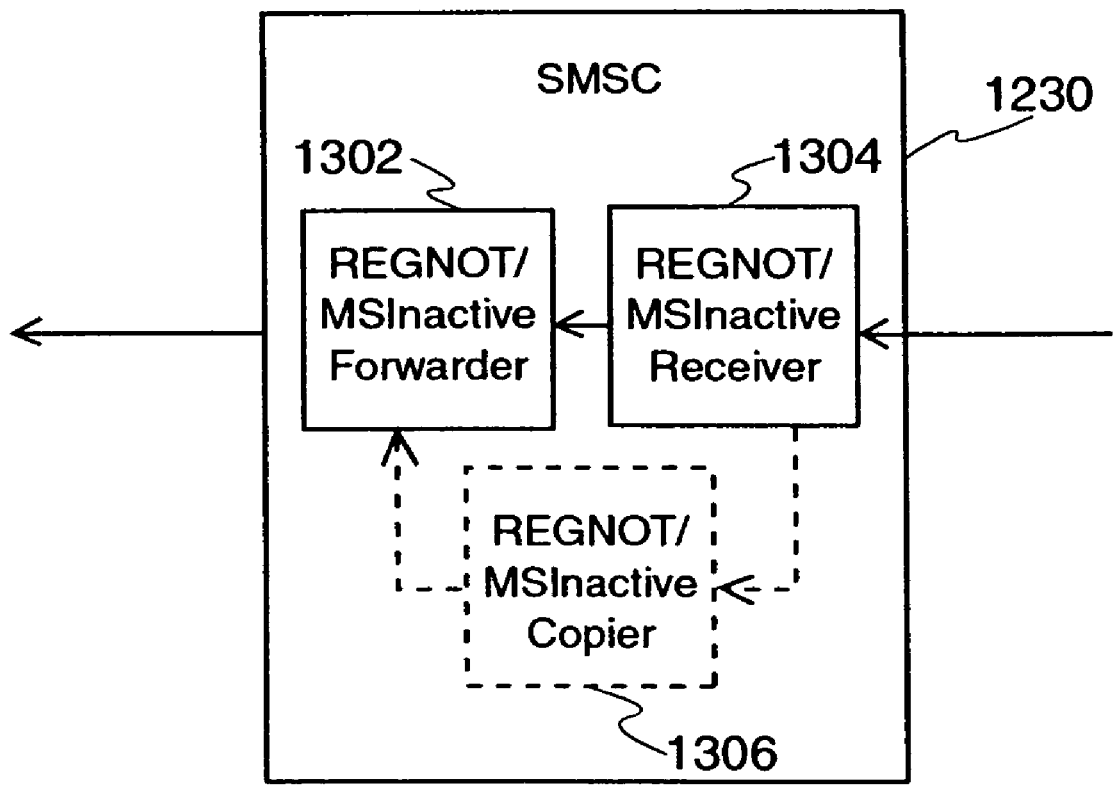
FIG. 13 shows a block diagram of the SMSC shown in FIG. 12, including a REGNOT/MSInactive message receiver, a REGNOT/MSInactive forwarder, and an optional REGNOT/MSInactive copier, in accordance with the principles of the present invention.

FIG. 12 shows an exemplary service implementation showing wireless chat status tracking providing an automatic on-line or off-line notification in a chat scenario using techniques and apparatus in accordance with the principles of the present invention. FIG. 13 shows a more detailed block diagram of the SMSC 1230 shown in FIG. 12, including a REGNOT message receiver 1304, a REGNOT forwarder 1302, and an optional REGNOT copier 1306.

For the purposes of illustration, assume that in FIGS. 12 and 13 all chat subscribers with the exception of Mobile A are already participating in a chat session called, e.g., "Buddies".

Scenario 1

Automatic On-Line Notification Chat Scenario in a Prepaid Environment (1) The handset Mobile A 1202, provisioned with chat service, is powered on or performs the IS-41 periodic or forced registration process. Thus, a Registration access message is sent from the Mobile A 1202 to the Mobile Switching Center (MSC) 1204.

(2) The MSC 1204 sends the IS-41 Registration Notification (REGNOT) message to the Home Location Register (HLR) 1206.

(3) Following the authentication process of Mobile A 1202, in accordance with the principles of the present invention, the HLR 1206 forwards the REGNOT message to, e.g., a relevant prepaid application server. This may be performed using an IS-41 REGNOT message over an SS7 network or an equivalent registration message over a TCP/IP network.

(4) The SMSC/Prepaid service 1230 may notify a suitable wireless Internet gateway 1210 that Mobile A 1202 is "on-line". Such a suitable wireless Internet gateway 1210 is shown and described in co-pending U.S. application Ser. No. 09/630,762, entitled "Wireless Internet Gateway" to Smith, filed Aug. 2, 2000.

If Mobile A 1202 is a prepaid subscriber, the prepaid service may verify an account balance for Mobile A 1202 at this point and can decide to continue service or not.

(5) The wireless Internet gateway 1210 forwards the REGNOT message to a relevant external chat server 1220 automatically indicating to that external application that Mobile A 1202 is "on-line".

(6) The external chat server 1220 determines that Mobile A 1202 belongs to a particular chat group, e.g., the chat group "Buddies" of the current example, and automatically registers Mobile A 1202 in the chat session.

(7) The external chat server 1220 notifies the other chat participants (e.g., the "Buddies" participants) that Mobile A 1202 is available by sending a broadcast text message to all current participants of that chat session. At the same time, the chat server 1220 may also notify Mobile A 1202 of all current participants of that chat session.

(8) The wireless Internet gateway 1210 automatically forwards chat messages from the chat server 1220 for delivery to the chat session participants via the relevant SMSC 1230.

(9) The short message service center (SMSC) 1230 requests the HLR 1206 for short message delivery to all participating mobile subscribers.

(10) The HLR 1206 provides the SMSC 1230 with all needed information to deliver the short messages.

(11) The SMSC 1230 stores and forwards the broadcast message to the MSC 1204 for delivery to the other chat participants (e.g., to Mobile B 1242 and Mobile C 1252), and the list of chat participants message to the automatically entering Mobile A 1202.

(12) The MSC 1204 delivers the chat messages to all participating mobiles 1202, 1242, 1252.

Scenario 2

Automatic Off-Line Notification Chat Scenario in a Prepaid Environment (1) The handset Mobile A 1202, provisioned with chat service, is powered off or has moved out of the relevant coverage area.

(2) The MSC 1204 detects an expiration of an inactivity timer and sends an IS-41 Inactivity message to the Home Location Register (HLR) 1206.

(3) The HLR 1206 forwards the Inactivity message, e.g., the IS-41 MS Inactivity message, over an SS7 network, or an equivalent inactivity message over a TCP/IP network to, e.g., a relevant prepaid application server such as the SMSC/Prepaid platform 1230.

(4) The SMSC/Prepaid service 1230 notifies the wireless Internet gateway 1210 that Mobile A 1202 is "off-line".

(5) The wireless Internet gateway 1210 forwards the message to the chat server 1220 that Mobile A 1202 is "off-line".

(6) The external chat server 1220 determines that Mobile A 1202 belongs to, e.g., the chat group "Buddies", and thus removes Mobile A 1202 from the chat session.

(7) The external chat server 1220 notifies the chat session participants, e.g., participants of the chat session "Buddies", that Mobile A 1202 has become unavailable, by sending a broadcast text message to all current chat participants.

(8) The wireless Internet gateway 1210 forwards the messages for delivery.

(9) The SMSC 1230 requests the HLR 1206 for short message delivery to all mobile subscribers.

(10) The HLR 1206 provides the SMSC 1230 with all needed information to deliver the messages.

(11) The SMSC 1230 stores and forwards the broadcast message for delivery to Mobile wireless devices B & C, 1242 & 1252.

The MSC 1204 delivers the messages to Mobile wireless devices B & C, 1242 & 1252.

Note that while the chat server 1220 shown in FIG. 12 is internal to the service provider's network, the principles of the present invention relate equally to placement of the chat server 1220 external to the service provider's network, i.e., over the Internet 1299.

This solution may be integrated with existing, commercially available SMSC & web gateway products that enable wireless carriers & Internet service providers (ISPS) to offer, e.g., a pre-payment billing option for enhanced messaging services.

The principles of the present invention have applicability for usage with wireless intelligent network (WIN) applications, e.g., those already otherwise containing SMSC, prepaid, and/or web gateway applications. Moreover, there is applicability for usage with mobile registration, for inactivity message forwarding to a chat server, or for mobile automatic notification of subscriber status to chat server.

While the invention has been described with reference to the exemplary embodiments thereof, those skilled in the art will be able to make various modifications to the described embodiments of the invention without departing from the true spirit and scope of the invention.

What is claimed is:

1. A mobile device status tracking system, comprising:
   a registration notification message receiver to receive a registration notification message from a home location register;
   a chat server to notify chat subscriber devices of a chat room group of a particular subscriber's device chat room group status in response to said received registration notification message; and
   a registration notification message forwarder to forward said registration notification message received by said registration notification message receiver over an Internet Protocol (IP) connection to said chat server;
   wherein said chat server automatically notifies said chat room group of said particular subscriber's device chat room group status in response to receipt of said registration notification message.

2. The mobile device status tracking system according to claim 1, wherein:
   said IP connection is an Internet connection.

3. The mobile device status tracking system according to claim 1, wherein:
   said registration notification message forwarder copies all registration notification messages received by a mobile switching center.

4. The mobile device status tracking system according to claim 1, further comprising:
   a wireless Internet gateway to transmit said forwarded notification message over said IP connection.

5. The mobile device status tracking system according to claim 4, further comprising:
   a registration notification message handler to communicate with said wireless Internet gateway using a Signaling System #7 communications protocol.

6. The mobile device status tracking system according to claim 1, wherein:
   said registration notification message is a previously forwarded registration notification message by a Home Location Register (HLR).

7. A method of tracking a status of a mobile device, comprising:
   receiving a registration notification message from a home location register at a registration notification message receiver;
   notifying, from a chat server, chat subscriber devices of a chat room group of a particular subscriber's device chat room group status in response to said received registration notification message; and
   forwarding, from a registration notification message forwarder, said registration notification message received by said registration notification message receiver over an Internet Protocol (IP) connection to said chat server;
   automatically notifying, from said chat server, said chat room group of said particular subscriber's device chat room group status in response to receipt of said registration notification message.

8. The method of tracking a status of a mobile device according to claim 7, wherein:
   said IP connection is an Internet connection.

9. The method of tracking a status of a mobile device according to claim 7, further comprising:
   copying, with said registration notification message forwarder, all registration notification messages received by a mobile switching center.

10. The method of tracking a status of a mobile device according to claim 7, further comprising:
    transmitting from a wireless Internet gateway said forwarded notification message over said IP connection.

11. The method of tracking a status of a mobile device according to claim 10, further comprising:
    establishing communications from a registration notification message handler and said wireless Internet gateway using a Signaling System #7 communications protocol.

12. The method of tracking a status of a mobile device according to claim 7, wherein:
    said registration notification message is a previously forwarded registration notification message by a Home Location Register (HLR).

13. The apparatus for tracking a status of a mobile device according to claim 12, further comprising:
    means for transmitting from a wireless Internet gateway said forwarded notification message over said IP connection.

14. The apparatus for tracking a status of a mobile device according to claim 13, further comprising:
    means for establishing communications from a registration notification message handler and said wireless Internet gateway using a Signaling System #7 communications protocol.

15. The apparatus for tracking a status of a mobile device according to claim 13, wherein:
    said registration notification message is a previously forwarded registration notification message by a Home Location Register (HLR).

16. Apparatus for tracking a status of a mobile device, comprising:
    means for receiving a registration notification message from a home location register at a registration notification message receiver;
    means for notifying, from a chat server, chat subscriber devices of a chat room group of a particular subscriber's device chat room group status in response to said received registration notification message; and
    means for forwarding, from a registration notification message forwarder, said registration notification message received by said registration notification message receiver over an Internet Protocol (IP) connection to said chat server;
    means for automatically notifying, from said chat server, said chat room group of said particular subscriber's device chat room group status in response to receipt of said registration notification message.

17. The apparatus for tracking a status of a mobile device according to claim 16, wherein:
    said IP connection is an Internet connection.

18. The apparatus for tracking a status of a mobile device according to claim 16, further comprising:
    means for copying, with said registration notification message forwarder, all registration notification messages received by a mobile switching center.

* * * * *